United States Patent
Hegde et al.

(10) Patent No.: US 11,522,782 B2
(45) Date of Patent: Dec. 6, 2022

(54) SYSTEM AND METHOD FOR MONITORING OPERATIONS AND DETECTING FAILURES OF NETWORKED DEVICES

(71) Applicant: ACCESS ONLINE INC., Wheeling, IL (US)

(72) Inventors: Vikram Hegde, Prospect Heights, IL (US); Avinash Kumar, Sahibganj (IN)

(73) Assignee: SCLERA HOLDINGS, LLC, Wheeling, IL (US)

( * ) Notice: Subject to any disclaimer, the term of this patent is extended or adjusted under 35 U.S.C. 154(b) by 0 days.

(21) Appl. No.: 17/813,579

(22) Filed: Jul. 19, 2022

(65) Prior Publication Data

US 2022/0353168 A1    Nov. 3, 2022

Related U.S. Application Data

(63) Continuation of application No. PCT/IB2021/056262, filed on Jul. 12, 2021.

(60) Provisional application No. 63/050,862, filed on Jul. 12, 2020.

(51) Int. Cl.
| | |
|---|---|
| *H04L 43/20* | (2022.01) |
| *H04L 41/06* | (2022.01) |
| *H04L 12/46* | (2006.01) |
| *G06F 9/455* | (2018.01) |
| *H04L 43/065* | (2022.01) |

(52) U.S. Cl.
CPC .......... *H04L 43/20* (2022.05); *G06F 9/45558* (2013.01); *H04L 12/4641* (2013.01); *H04L 41/06* (2013.01); *H04L 43/065* (2013.01); *G06F 2009/45591* (2013.01); *G06F 2009/45595* (2013.01)

(58) Field of Classification Search
CPC ... H04L 43/065; H04L 43/20; H04L 12/4641; H04L 41/06; G06F 9/45558; G06F 2009/45591; G06F 2009/45595
See application file for complete search history.

(56) References Cited

U.S. PATENT DOCUMENTS

| | | |
|---|---|---|
| 7,260,597 B1 | 8/2007 | Hofrichter et al. |
| 8,527,306 B1 | 9/2013 | Reeser et al. |
| 9,806,900 B2 | 10/2017 | Jacobson et al. |

(Continued)

FOREIGN PATENT DOCUMENTS

WO    2019216975 A1    11/2019

OTHER PUBLICATIONS

Bellavista, Paolo, and Alessandro Zanni. "Feasibility of fog computing deployment based on docker containerization over raspberrypi." Proceedings of the 18th international conference on distributed computing and networking. (Year: 2017).*

(Continued)

*Primary Examiner* — John M Macilwinen
(74) *Attorney, Agent, or Firm* — Holzer Patel Drennan

(57) ABSTRACT

A system and method for monitoring operations and detecting failures of a plurality of connected devices installed on a premises determines the correct vendor for failure resolution and provides the vendor with a secure and limited mechanism to access assigned devices remotely for servicing. The system limits vendor access to only devices configured on a respective virtual network provisioned in a container provided on a network monitoring device.

22 Claims, 18 Drawing Sheets

(56) References Cited

U.S. PATENT DOCUMENTS

| | | | |
|---|---|---|---|
| 10,229,394 B1 | 3/2019 | Davis et al. | |
| 10,740,169 B1 | 8/2020 | Passaretti et al. | |
| 2012/0254345 A1 | 10/2012 | Montoya | |
| 2013/0016628 A1* | 1/2013 | Bertani | H04L 41/046 370/255 |
| 2017/0214550 A1* | 7/2017 | Kumar | G06F 9/5077 |
| 2018/0336113 A1* | 11/2018 | Asawa | G06F 11/3433 |
| 2019/0289480 A1 | 9/2019 | Safavi | |
| 2020/0028894 A1* | 1/2020 | Memon | G06F 3/0605 |
| 2020/0050494 A1 | 2/2020 | Bartfai-Walcott et al. | |
| 2020/0125053 A1 | 4/2020 | Park et al. | |
| 2020/0136906 A1 | 4/2020 | Guim Bernat et al. | |

OTHER PUBLICATIONS

Souza, Arthur, et al. "Osmotic monitoring of microservices between the edge and cloud." 2018 IEEE 20th International Conference on High Performance Computing and Communications; IEEE 16th International Conference on Smart City; IEEE 4th International Conference on Data Science and Systems, IEEE. (Year: 2018).*

Ji, Shujian, Kejiang Ye, and Cheng-Zhong Xu. "Cmonitor: A monitoring and alarming platform for container-based clouds." International Conference on Cloud Computing. Springer, Cham. (Year: 2019).*

Von Leon, David, et al. "A performance exploration of architectural options fora middleware for decentralised lightweight edge cloud architectures." IoTBDS 2018: Proceedings of the 3rd International Conference on Internet of Things, Big Data and Security; Funchal, Madeira, Portugal, 19-21. (Year: 2018).*

Xingtao, Liu, et al. "Network virtualization by using software-defined networking controller based Docker." 2016 IEEE Information Technology, Networking, Electronic and Automation Control Conference. IEEE. (Year: 2016).*

Dini, MahyarTaj, and Volodymyr Sokolov. "Internet of Things security problems." arXiv preprint arXiv:1902.08597. (Year: 2019).*

Stubbs, Joe, Walter Moreira, and Rion Dooley. "Distributed systems of microservices using docker and serfnode." 2015 7th International Workshop on Science Gateways. IEEE. (Year: 2015).*

Written Opinion of the International Searching Authority in international application No. PCT/IB2021/056262 dated Oct. 1, 2021; 6 pages.

* cited by examiner

SYSTEM AND METHOD FOR MONITORING OPERATIONS AND DETECTING FAILURES OF NETWORKED DEVICES

CROSS REFERENCE TO RELATED APPLICATIONS

This application claims the benefit of priority pursuant to 35 U.S.C. § 119(e) of U.S. provisional application No. 63/050,862 filed 12 Jul. 2020 entitled "System and method for monitoring operations and detecting failures of networked devices," which is hereby incorporated herein by reference in its entirety. This application is a continuation of Patent Cooperation Treaty international application no. PCT/162021/056262 filed 12 Jul. 2021 entitled "System and method for monitoring operations and detecting failures of networked devices," which is hereby incorporated herein by reference in its entirety.

TECHNICAL FIELD

The invention presented herein is generally directed towards a system and method for monitoring operations and detecting failures of a plurality of connected devices on a local area network. More particularly, but not limited to, the invention comprises a system and method for determining a correct vendor or resource to address a failure and providing the vendor or resource with the ability to remotely access the networked device for servicing.

BACKGROUND

The subject matter discussed in the background section should not be assumed to be prior art merely as a result of its mention in this background section. Similarly, a problem mentioned in this background section or associated with the subject matter of the background section should not be assumed to have been previously recognized in the prior art.

With the proliferation of Internet technology, the demand for connected devices to perform various functions has increased. Functions performed, for examples in premises, include without limitation heating, ventilation, and air conditioning (HVAC), lighting controllers, audio-visual systems, security systems, video surveillance, water heater, gas, electricity, network devices, building automation, WIFI infrastructure, cellular network boosters, access control, fire panel, and telephony. To perform these functions, a plethora of connected devices are installed on the premises which subsequently increases the complexity of their maintenance. These functionalities necessarily are supported by multiple vendors. When anything fails the end-user has to potentially call multiple people to identify the root cause of the failure and then call the right vendor or service providers to personally identify or troubleshoot the issue. This may cause several trips and unnecessary costs in resolving a problem. Even routine services (e.g., changing HVAC filters) are missed due to the absence of alerting tools. Further, each connected device category has unique vendors, protocols, installers, and management software and these connected devices require skilled labor for monitoring and maintenance, which is expensive and limited.

There are various monitoring devices of network system which exist in the art. However, existing monitoring devices have various compatibility restrictions that are bound to a particular brand of connected devices. With the multiplicity of connected devices (HVAC, WIFI, security cameras, etc.), an end-user is left with a convoluted process to monitor his connected devices which requires domain-specific expertise. Existing monitoring devices have various limitations such as they need to be connected to the Internet, lack of a process to determine vendor information based on system failure, inefficiently handle of diagnostic information, and fail to share diagnostic data with both vendors and the end-user. Further, existing monitoring devices do not generally enable the vendor to remotely access their connected devices. Also, existing monitoring devices rely on a server that acts as a "middleman" to provide remote access which is expensive to maintain.

Therefore, there is a need for an efficient system and method for monitoring operations and detecting failures of a plurality of connected devices. Further, there is a need for a system and method for identifying and isolating failures in connected devices in real time. Still further, there is a need for a system and method for determining the correct resource or vendor to address a networked device failure and providing the resource or vendor with a method to access the affected connected devices for remote servicing.

The information included in this Background section of the specification, including any references cited herein and any description or discussion thereof, is included for technical reference purposes only and is not to be regarded subject matter by which the scope of the invention as defined in the claims is to be bound.

SUMMARY

Systems and methods for monitoring operations and detecting failures of a plurality of connected devices installed on a local area network (LAN) at a premises are disclosed herein, substantially as shown in and/or described in connection with the figures.

One aspect of the present disclosure relates to a system and method for monitoring operations and detecting failures of a plurality of connected devices installed on the LAN at the premises. The disclosed system may include a device monitoring system communicatively coupled with a plurality of devices connected on the LAN to capture operational data from the connected devices. The device monitoring system monitors the operational data and provides alerts to a premises operator upon detecting any failures based on the monitored operational data. The device monitoring system may also be configured to transmit alerts to relevant device maintenance or service vendors regarding the failures. The vendor alerts may be automatic or may be instigated or approved by the premises operator. With the premises operator's permission, the vendor may be provided temporary access to one or more devices on the premises for troubleshooting or configuration purposes. The access rights may be time limited or cease upon completion of a maintenance activity by the vendor, and may be retracted at any time by the operator. The device monitoring system may limit network access of the vendor to only permitted devices.

In order to provide vendor access to remotely maintain, troubleshoot, or repair one or more of the devices connected to the LAN, the device monitoring system may further include specially configured access control hardware and software components connected to the LAN. The access control components (hereinafter, "access controller") may be connected to a number of subnetworks within the LAN, for example, a security camera subnetwork connected to all the security cameras on the premises or a lighting system subnetwork connected to lights in common areas of the premises. The access controller may instantiate a respective container environment for each of the subnetworks or for a subset of devices connected on the LAN. Each container environment is configured with an interface to allow an external service vendor limited access to only the network devices for which the service vendor is responsible. The container environments are independent of each other and do not communicate with each other.

The device monitoring system, including the access controller, provides a direct Internet connection, preferably through a secondary or a backup Internet service provider (ISP) with a public IP address separate from the primary gateway device (e.g., router or other network address translation (NAT) device) providing Internet access for the LAN. Alternately, the device monitoring system may be positioned behind a NAT with port forwarding to the device monitoring system on the LAN. A vendor can configure an associated device within one of the containers with the premises operator's permission. Each vendor-specific container may be configured to automatically discover every connected device in the subnetwork allocated to the container (e.g., IP device, serial device, wireless device, BACnet device, etc.) depending on the type of device connected on the subnetwork and assigned to the vendor container.

The discovered devices to be monitored are presented to the vendor through an interface in their respective container. Threshold parameters for initiating alarms upon failure detection such as connection loss, data loss, network loop, IP address change, DOS attacks, temperature fluctuation, current-voltage fluctuation, and erratic behavior may be set in the monitoring interface in the container by the vendor. Further, device serial numbers, warranty information, and model numbers may be entered by the vendor into data tables for each device associated with the container. For each of the containers, the network topology is determined during discovery and parent and child objects are determined and grouped accordingly. Parameters for alert mechanisms, email notification, SMS, and ticketing systems may also be set in the containers. The containers may also be provided with basic network management tools such as ping/ARP, NsLookUp, speed test, node test, HTTP and HTTPS access, tenet, SSH, device discovery, duplicate IP protection, NetStat/Tracert, port checker, MAC to the vendor, IfConfig/IpConfig, and others.

When any new connected devices are associated with a vendor (e.g., a new device is added to the corresponding vendor subnetwork), the device monitoring system can automatically determine and route to the default IP address for the type of device to configure the device within the appropriate container. The disclosed system can enable remote access to a specific networked device on a specific port without port forwarding by the primary gateway device for the LAN. Remote vendor access is limited by an authentication process. The disclosed system performs random port and URL generation, encryption, and incorporates timer mechanisms to prevent any type of unauthorized use. When issues or trouble are identified in any networked device, a machine learning server accessible by the device monitoring system can also suggest a solution. The device monitoring system may also incorporate appropriate application program interfaces (APIs) to integrate with property management software to provide real-time status of each system.

In one embodiment, the device monitoring system determines the correct vendor for a resolution and provides the vendor with a mechanism to remotely access its associated network devices for servicing. The device monitoring system also provides secure, remote access for the service vendor to the connected devices after permission is granted by the premises owner.

In another embodiment, the device monitoring system identifies the occurrence and probable types of failures in connected devices as they arise.

In another embodiment, the device monitoring system performs preventative actions and takes proactive measures to avoid service interruptions and any unnecessary notifications to vendors. The device monitoring system thereby advantageously reduces the number of on-premises service calls by vendors necessary to address networked device failures.

The device monitoring system may provide for monitoring and maintenance of connected devices in various properties, like hospitality locations, student living, assisted living, residential homes, apartment buildings, and commercial buildings. The device monitoring system monitors all the connected devices in an Internet of Things (IoT) environment, regardless of the device protocol, type, and brand.

In one implementation, a method is disclosed for monitoring operations and detecting failures of devices connected on a local area network. First, a plurality of devices connected to the local area network may be discovered. Next a subset of the discovered devices may be selected for monitoring. A container environment may be created within a monitoring device connected to the local area network, wherein the container environment is provisioned with a virtual network limited to the selected subset of the discovered devices. A status of the selected subset of the discovered devices on the local area network may be regularly monitored. Reporting may be provided to the container environment regarding the status of the selected subset of the discovered devices in the virtual network. Additionally, access to the container environment may be provided to a remote computing device external to the local area network for communication with the selected subset of the discovered devices by the remote computing device, whereby access by the remote computing device to the local area network is limited to the selected subset of the discovered devices provisioned on the virtual network in the container environment.

In another implementation, a monitoring device is disclosed for use on a local area network for monitoring operations and detecting failures of devices connected within the local area network. The monitoring device may include a first network connector for connecting the monitoring device to a switch connected to the devices on the local area network, a memory including a database structure; and a processor configured to perform a number of operations. The processor may discover a plurality of devices connected to the local area network and select a subset of the discovered devices for monitoring. The processor may further create a container environment within the monitoring device, wherein the container environment is provisioned with a virtual network limited to the selected subset of the discovered devices. The processor may regularly monitor status of the selected subset of the discovered devices on the local area network and provide reporting to the container environment regarding the status of the selected subset of the discovered devices in the virtual network. The processor may additionally provide access to the container environment to a remote computing device external to the local area network for communication with the selected subset of the discovered devices by the remote computing device, whereby access by the remote computing device to the local area network is limited to the selected subset of the discovered devices provisioned on the virtual network in the container environment.

Accordingly, one advantage of the present invention is that it automates the monitoring process of all the connected devices. Another advantage is that it isolates the networked device failures as they arise and determines the correct vendor to notify for failure resolution. Another advantage is that it provides the vendor with a method to remotely access their associated networked device for servicing. Another advantage is that it provides diagnostic information to the end-user and vendors of the connected devices.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. A more extensive presentation of features, details, utilities, and advantages of the present invention as defined in the claims is provided in the following written description of various embodiments and implementations and illustrated in the accompanying drawings.

BRIEF DESCRIPTION OF THE DRAWINGS

The accompanying drawings illustrate the embodiments of systems, methods, and other aspects of the disclosure. The illustrated element boundaries (e.g., boxes, groups of boxes, or other shapes) in the figures represent examples of the boundaries. In some examples, one element may be designed as multiple elements, or multiple elements may be designed as one element. In some examples, an element shown as an internal component of one element may be implemented as an external component in another and vice versa. Furthermore, the elements may not be drawn to scale.

Various embodiments will hereinafter be described in accordance with the appended drawings, which are provided to illustrate, not limit, the scope, wherein similar designations denote similar elements. And which are not intended to indicate any preference or requirement for an illustrated embodiment to the exclusion of embodiments described with reference thereto.

DETAILED DESCRIPTION

The present description is best understood with reference to the detailed figures and description set forth herein. Various embodiments of the disclosed system and method have been discussed with reference to the figures. However, those skilled in the art will readily appreciate that the detailed description provided herein with respect to the figures are merely for explanatory purposes, as the disclosed system and method may extend beyond the described embodiments. For instance, the teachings presented, and the needs of a particular application, may yield multiple alternative and suitable approaches to implement the functionality of any detail of the disclosed systems and methods described herein. Therefore, any approach to implement the disclosed system and method may extend beyond certain implementation choices in the following embodiments.

According to an embodiment herein, the methods of the present invention may be implemented by performing or completing manually, automatically, and/or a combination of thereof. The term "method" refers to manners, means, techniques and procedures for accomplishing any task including, but not limited to, those manners, means, techniques, and procedures either known to the person skilled in the art or readily developed from existing manners, means, techniques and procedures by practitioners of the art to which the present invention belongs. The persons skilled in the art will envision many other possible variations within the scope of the disclosed system and method described herein.

Figure 1:
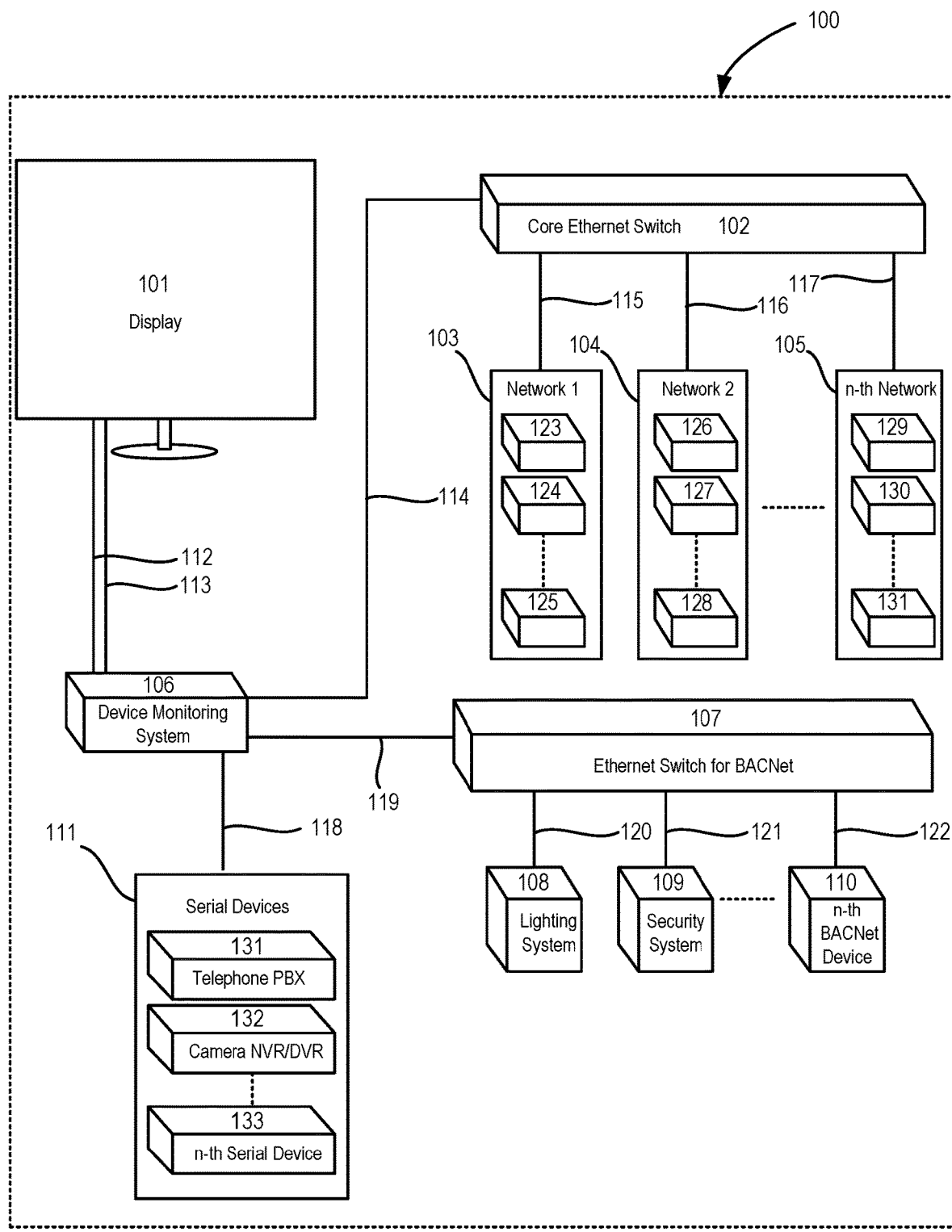
FIG. 1 illustrates an installation diagram of the disclosed system for monitoring operations and detecting failures of a plurality of connected devices installed on a premises, in accordance with one embodiment of the present invention.

FIG. 1 illustrates an example network installation 100 of a plurality of devices installed on premises such as hotels, residential apartment buildings, commercial buildings, hospitals, warehouses, etc., and connected via a local area network. The disclosed network installation 100 includes a device monitoring system 106 communicatively coupled with the plurality of connected devices on a local network to monitor operational data from and detect failures of the connected devices. The device monitoring system 106 may be a special purpose computer device including a processor, memory for instantiation of software applications, data storage, and communication connections (e.g., ethernet ports, universal serial bus (USB) ports, etc.) for connecting the device monitoring system 106 to a local area network. The device monitoring system 106 is connected with a user interface device 101 such as a desktop computer, a tablet, a smartphone, a laptop computer, or other similar device via an electrical communication (112, 113) to display the operational data captured from the connected devices and provide an interface for a premises operator to control functionality of the device monitoring system 106.

Further, as shown, the device monitoring system 106 may be communicatively coupled with a core Ethernet switch 102, an ethernet switch for a Building Automation and Control network (BACnet) 107, and a plurality of serial devices 111. The core ethernet switch 102, the ethernet switch for BACnet 107, and the plurality of serial devices 111 may be connected directly to the device monitoring system 106 over any of a variety of physical or wireless connections (represented as 114, 119, and 118). Possible connection options may include, but are not limited to, Ethernet, the Internet, Wireless Local Area Network (WLAN), Bluetooth, Wi-Fi, Long Term Evolution (LTE), Worldwide Interoperability for Microwave Access (WiMAX), and General Packet Radio Service (GPRS).

The core Ethernet switch 102 may interconnect with a plurality of subnetworks to provide a compact, programmable, and scalable core and aggregation network devices for enterprise environments. The plurality of subnetworks includes a first subnetwork 103, a second subnetwork 104, and an nth subnetwork 105. Each of the subnetworks may comprise a connection between a plurality of network devices such as devices 123, 124, and 125 on the first subnetwork 103, devices 126, 127, and 128 on the second subnetwork 104, and devices 129, 130, and 131 on the nth subnetwork 105. The core Ethernet switch 102 receives communication data from each of the subnetworks 103, 104, and 105 to handle multiple data transmissions between devices on the network simultaneously. The first subnetwork 103, the second subnetwork 104, and the nth subnetwork 105 transmit the data to the core Ethernet switch 102 through the physical or wireless connections 115, 116, and 117 shown in FIG. 1.

The ethernet switch for BACnet 107 may be connected to a plurality of BACnet-provisioned devices such as a lighting system 108, a security system 109, and an nth BACnet system 110 (e.g., an HVAC system). The BACnet devices use IP addresses and Ethernet MAC addresses just like other UDP/IP network devices. Further, the BACnet devices transmit their operational data to the Ethernet switch for BACnet 107 at will and allow the BACnet Ethernet switch 107 to deal with packet collisions and retries as needed. The ethernet switch for BACnet 107 and the BACnet devices on each system 108, 109, 110 are connected via physical or wireless connections 120, 121, and 122 as with devices on other networks.

The plurality of serial devices 111 may include a telephone private branch exchange (PBX) 131, a camera/digital video recorder (DVR)/network video recorder (NVR) 132, and an nth serial device 133. Typically, PBX 131 is a private telephone network used within an organization such as a company or association. The DVR/NVR 132 is typically used for video security surveillance.

In an exemplary operation, the device management system 106 may be installed in a centrally managed resident building, hotel, student living, or assisted living premises. These properties have a large array of connected devices which may include, but are not limited to, wireless access points (WAPs), network gateways and switches, computer servers, client computers, Point of Sale (PoS) systems, interface devices, telephone systems, IPTV management systems, energy management systems, automation systems, HVAC systems, water boilers, and security systems. All these different systems can be linked to the device monitoring system 106.

The device monitoring system 106 can then use a library of protocols and application programming interfaces (APIs) to communicate with all the devices comprising these systems to determine whether the devices are functioning properly and, if not, determine the point of failure, suggest troubleshooting steps, and provide vendor support information that is specific to the system of devices. For example, at regular intervals (e.g., every 60 seconds) the device monitoring system 106 can check the "heartbeat" of every device assigned to a container to determine whether each device is functioning at a base level. The heartbeat check can be performed by sending Address Resolution Protocol (ARP) requests on the network and monitor for replies from all container devices. If an expected reply is not received, further diagnostic testing may be initiated as described, for example, in the discussion of FIG. 3 below. Additionally, the device monitoring system 106 can be configured to regularly schedule use of device-specific tools to check the status of sensors or parameter values associated with a particular type of device. If any of the values are outside of known norms, the device monitoring system may first recheck to avoid a false alarm. Other parameters may also be verified, e.g., through DNS checks, ISP checks, dependency checks (e.g., when one ISP is used for multiple networks). Furthermore, the device monitoring system 106 can send regular diagnostic information about different systems of devices to their respective service vendors.

Figure 2:
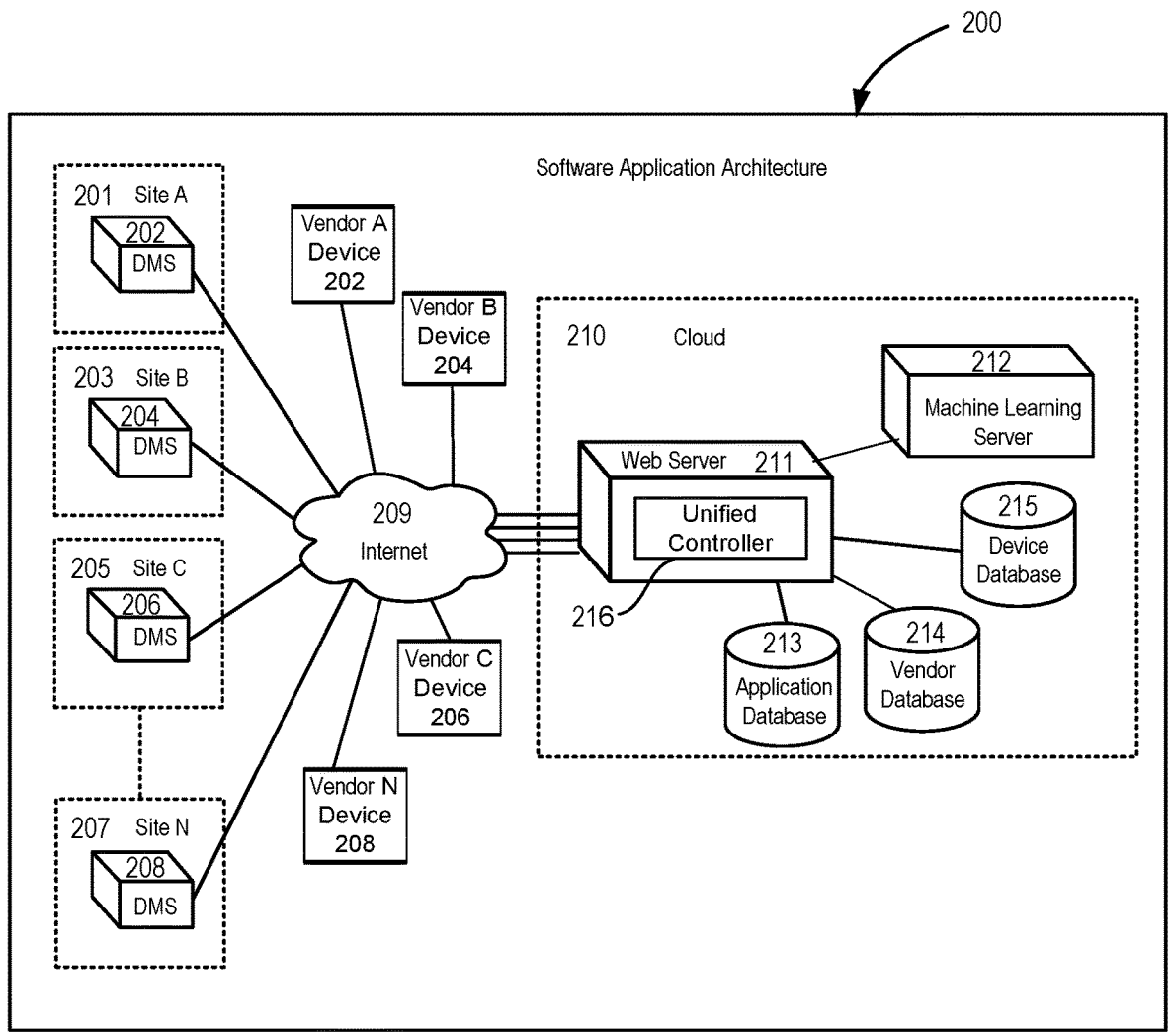
FIG. 2 illustrates a block diagram of the server architecture of the disclosed system, in accordance with another embodiment of the present invention.

FIG. 2 illustrates a block diagram of an exemplary server architecture 200 of the disclosed system, in accordance with an example embodiment. As indicated in FIG. 2, various device monitoring systems 202, 204, 206, and 208 may be installed at various geographically separated sites 201, 203, 205, and 207. The device monitoring systems 202, 204, 206, and 208 may be connected to a cloud network 210 over the Internet 209. The cloud network 210 may include a web server 211, a machine learning server 212, an application database 213, a vendor database 214, and a device database 215. The web server 211 may also host a number of unified controllers 216, e.g., one for each vendor 202, 204, 206, 208 that may have service contracts at a plurality of the sites 201, 203, 205, and 207 or for a premises owner of a number of the sites 201, 203, 205, and 207. The unified controllers 216 may be software instantiations that monitor the operational data and transmit alerts to the premises owners as well as the relevant vendors upon detecting any failures based on the monitored operational data across multiple ones of the sites 201, 203, 205, and 207. Vendors can only access, view, and manage the connected devices assigned to them within the system interface. The vendor may be provided temporary access to any connected device assigned to the vendor for a stipulated time or under stated rules or conditions as set by the premises owner.

The machine learning server 212 may receive operational data from various devices and premises and process algorithms to identify common issues and solutions to device and network problems. When faults or failures are detected in any connected device, the machine learning server 212 can also suggest resolution options. The application database 213 may provide a repository of applications for use by vendors to diagnose and repair problems with devices on premises networks. The APIs from the application database 213 may, for example, integrate with property management software to provide real-time status of each system. The vendor database 214 may provide a repository of vendors and contact information for use by premises owners to assign device management authority for premises devices under their control. The device database 215 may provide an extensive library of device information for use by vendors in identifying, troubleshooting, and repairing various makes and models of devices on a premises.

Each device monitoring system 202, 204, 206, and 208 may transmit operational information to the webserver 211 and receive information from the web server 211 specific to devices or operational issues occurring at the specific premises. The web server 211 receives captured operational data from the device monitoring systems 202, 204, 206, and 208 and may transmit the operational data to the machine learning server 212, and the device database 215 to populate a centralized repository of common issues and solutions to device and network problems that can be shared among all the device monitoring systems 202, 204, 206, and 208.

Figure 3:
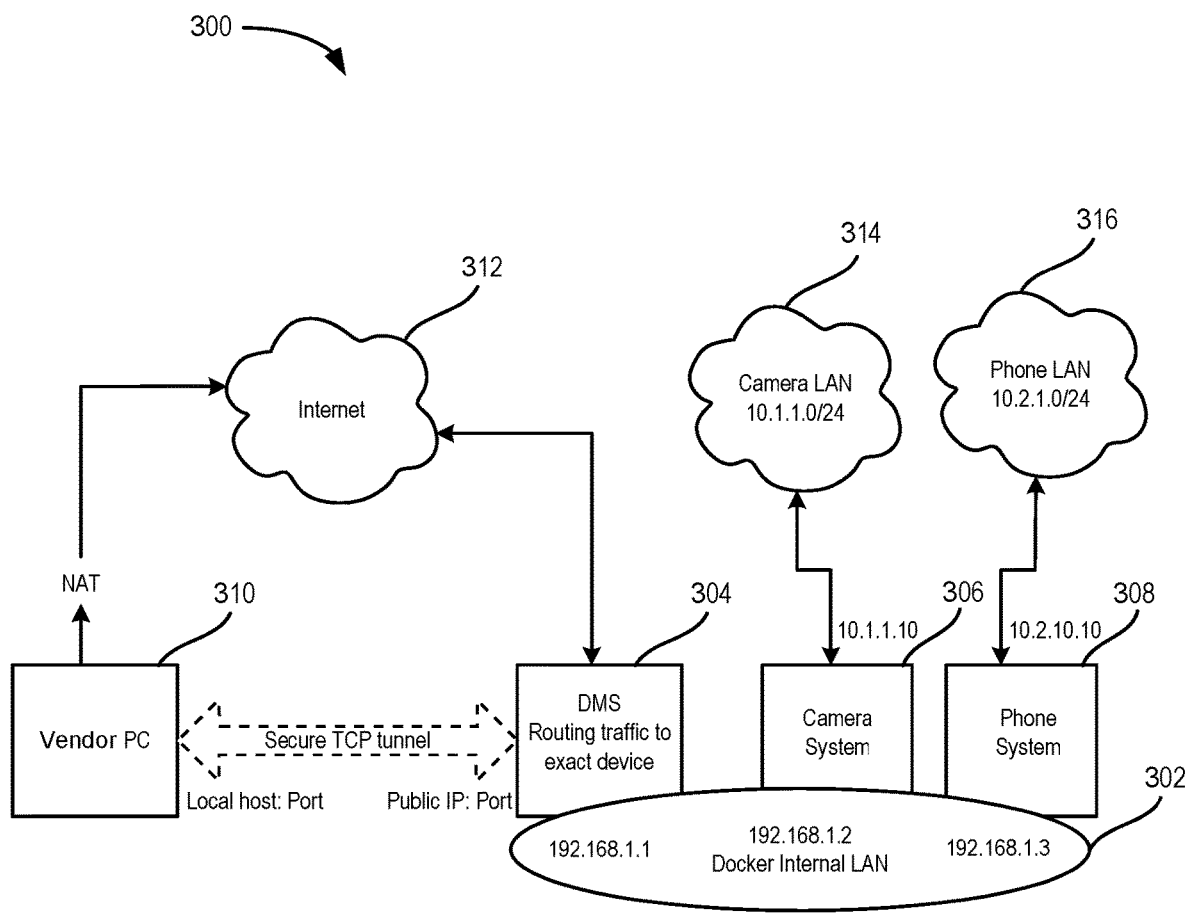
FIG. 3 illustrates a block diagram of a container instantiation and a secure TCP tunnel of the disclosed system, in accordance with at least one embodiment.

FIG. 3 illustrates a block diagram 300 of a container environment and an exemplary secure TCP tunnel of the disclosed system, in accordance with at least one embodiment. The device monitoring system 304 may instantiate a container 302 for providing access to a virtual LAN which, in the exemplary embodiment shown, includes a camera system 306 and a phone system 308 on a VLAN with the device monitoring system 304. The camera system 306, and the phone system 308 are connected within their corresponding subnetworks 314 and 316 within the larger local area network. The device monitoring system 304 may instantiate a plurality of container environments, e.g., within a Docker engine, for any number of VLANs that include respective subsets of the connected devices. Any container 302 may include any subset of the devices on the network as allocated by a premises operator for access by a particular vendor as part of a dedicated VLAN associated with the container. Typically, all devices on the same subnetwork (i.e., behind a particular switch, e.g., all security cameras) would be assigned to a single virtual network 302 for a vendor. However, such is not required and any combination of devices on the local area network can by assigned to a VLAN within a container.

The device monitoring system 304 is connected with the vendor's personal computer (PC) 310 through a secure TCP tunnel over the Internet 312. The secure TCP tunnel provides a network tunnel between the device monitoring system 304 and the vendor PC 310. The secure TCP tunnel allows the vendor to remotely access or control the connected devices on the VLAN within the container 302 assigned to the vendor through the device management system. Containers 302 are independent of each other and bundle their own diagnostic and repair tools, software, libraries, and configuration files and, in this implementation, are configured not communicate with each other. Thus, third party vendor are only allowed access to the VLAN within their assigned container 302 and are unable to connect with other devices on the entire local area network. By controlling and limiting network access to third parties (e.g., service vendors) to only devices on the VLAN within assigned containers, network security is enhanced.

The device monitoring system 304 may be configured with a Internet connection, preferably a secondary or a backup ISP with a public IP address or behind a NAT on the LAN providing the public IP address and port forwarding service to the device monitoring system 304. The premises operator may initially configure containers within the device monitoring system 304 or a vendor can configure an assigned container 302 with the owner's permission. The container 302 may be configured to discover every connected device in the container VLAN (e.g., IP devices, serial devices, wirelessly networked devices (e.g., 802.11 WiFI, LoRaWAN, Bluetooth), and BACnet devices) depending on the type of connected device selected as described in greater detail with respect to FIGS. 5-6B. The connected devices to be monitored are added to their respective container 302. Threshold parameters may be set in the containers 302 by vendors or premises operators for initiating alarms upon detecting failures such as connection loss, data loss, network loop, IP address change, DOS attacks, temperature fluctuation, current-voltage fluctuation, erratic behavior, etc. Further, device serial numbers, warranty information, and model numbers may be entered into local data stores in the containers 302. For each of the containers 302, the network topology may be determined, i.e., parent and child objects may be determined and grouped accordingly and stored in a data store within the container. Vendor information for each connected device within the container 302 is identified and available to the container 302, including any permissions or authentication requirements for access by a vendor. A basic network tool set (e.g., as shown in FIG. 7) like ping/ARP, tracert, NsLookUp, speed test, node test, HTTP access, https access, tenet, SSH, device discovery, duplicate IP protection, NetStat/Tracert, port checker, MAC to the vendor, IfConfig/IpConfig, is provided to the containers 302 by default.

In case any new connected devices are assigned to a vendor, the device monitoring system 304 may automatically route to the new device's default IP address to configure the same. The disclosed system can create remote access to a specific connected device on a specific port without additional port forwarding to specific devices by the gateway NAT device for the entire LAN, which would open the entire LAN to third party access. Remote access through the device monitoring system 304 may be further limited by authentication processes. The device monitoring system 304 may also perform random port and URL generation for public port connections, data encryption, and a timer mechanism for vendor dwell time in the container 302 to minimize the possibility of unauthorized access or use.

Figure 4:
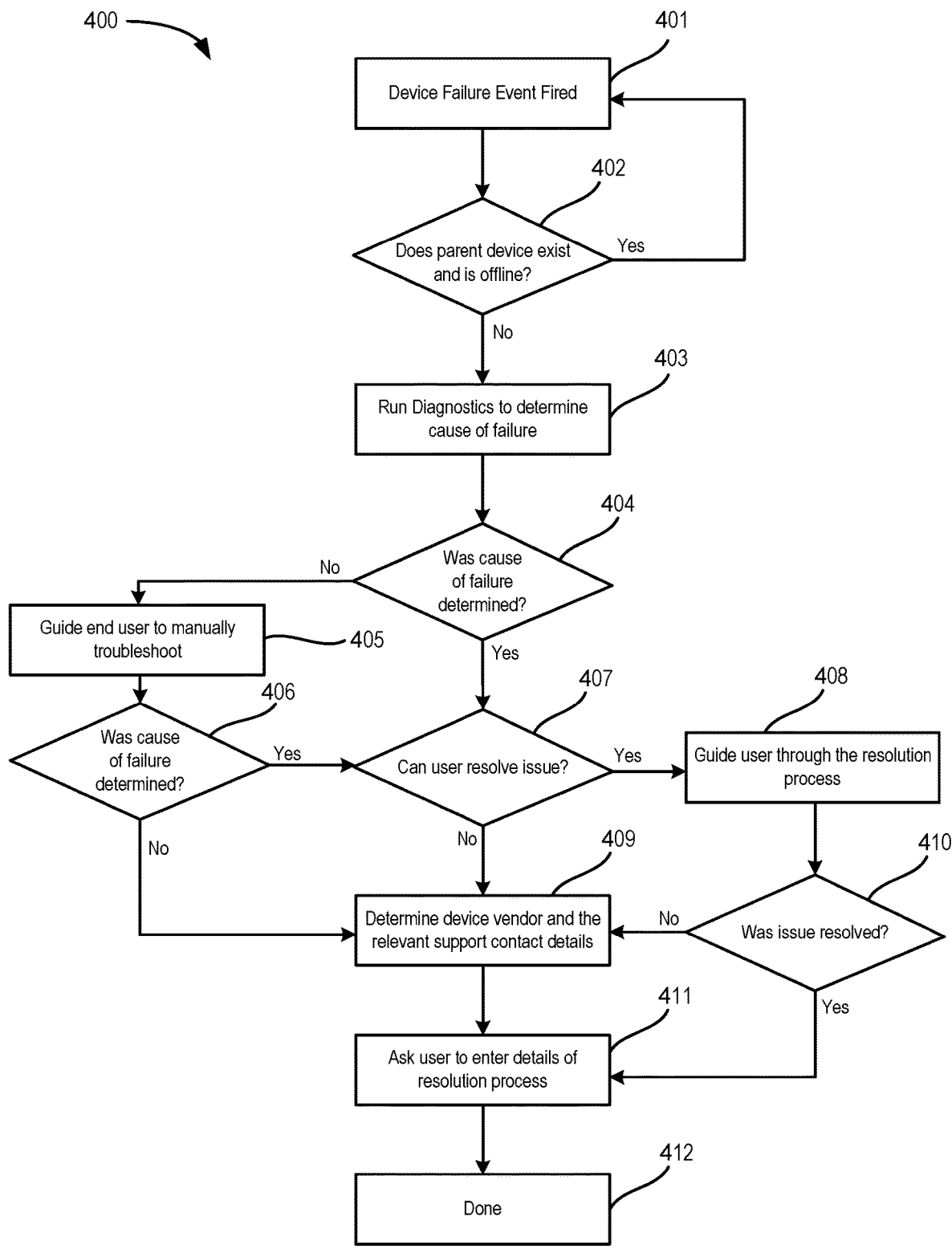
FIG. 4 illustrates a diagnostic flow diagram of the disclosed system, in accordance with at least one embodiment.

FIG. 4 illustrates an exemplary diagnostics flow diagram 400 of the device monitoring system, in accordance with at least one embodiment. Each container in the device monitoring system regularly checks each device (e.g., every 60 seconds) on the VLAN within the respective container for status. For example, the container may send a unicast ARP request to each device on the VLAN. If a device on the VLAN in the container failes to respond, at step 401, the device failure event is fired by the device monitoring system. At step 402, the device monitoring system determines whether a parent device exists and is offline. The network topology provides a hierarchy of connectivity. For example, a hotel with one hundred rooms may have multiple switches to which devices (e.g., thermostats) are connected. One port on each switch may connect the switch to a port on a higher level switch. This can continue in a daisy chain manner (creating a physical subnetwork) until reaching the connection to the device monitoring system. In an alternative configuration, wireless devices may be assigned to particular WiFi routers that are similarly connected in a hierarchy before connection to the device monitoring system. A parent device may be at the top, e.g., the switch in the subnetwork directly connected to the device monitoring system. As noted, the device below a parent device can be a parent for other child devices, continuing the chain until the final edge devices are reached. By following the topology of the subnetwork, if there is a connectivity issue, the device monitoring system can first determine whether there is a network connectivity issue with a parent device, possibly affecting multiple devices, rather than merely indicating that a plurality of edge devices are all individually malfunctioning. Alternatively, if all the parent devices are functioning, the device monitoring system is clearly able to identify the affected device and notify the premises owner and ultimately the appropriate service vendor if necessary.

Upon determining that a parent device exists on the subnetwork and is offline, the device monitoring system again initiates step 401 and fires a failure notice to the premises owner indicating that a parent device is offline affecting a number of devices on the network. If the parent devices are working and a particular device is determined to be malfunctioning (i.e., parameters are outside of a normal operating range), the device monitoring system runs diagnostics to determine a cause of failure as indicated at step 403. At this time, an alert regarding the particular device may be sent to the responsible service vendor and premises owner. For example, in the context of a hotel environment, if a device is offline or responding with data outside of expected norms (e.g., a temperature sensor indicates a room is too warm), then a message may be relayed to the property management system (e.g., hotel check-in software) through an API and the room may be placed in out of order. This prevents guest from checked in to effected rooms until the problem is diagnosed and corrected.

At step 404, the device monitoring system identifies whether the cause of failure is determined. At step 405, upon non-identification of the cause of failure, the device monitoring system may guide the premises operator to manually troubleshoot the device and identify the cause of failure. In some implementations, resolution templates may be provided within the device monitoring system to guide premises owner through known steps to resolve common issues, including physical investigation if necessary. At step 406, the device monitoring system identifies whether the cause of failure is determined by the premises operator. At step 407, it is determined whether the premises operator was able to resolve the issue upon identification of the cause of failure. At step 408, if the premises operator is likely able to resolve the issue, the device monitoring system guides the premises operator through a resolution process. At step 310, the device monitoring system determines whether the issue is resolved after guiding the premises operator through the resolution process. At step 409, if the premises operator is not able to resolve the issue directly or where the cause of failure is not determined, the device monitoring system automatically determines the service vendor for the malfunctioning device and accesses the relevant support contact details and provides them to the premises operator. Contact of the service vendor may be performed manually or through an interface provided within the device monitoring system that integrates with e-mail, SMS messaging, or service ticketing systems, for example. At step 411, the end-user is prompted to enter details of the resolution process. At step 412, the process of diagnosis ends upon receiving the details of the resolution process.

Figure 5:
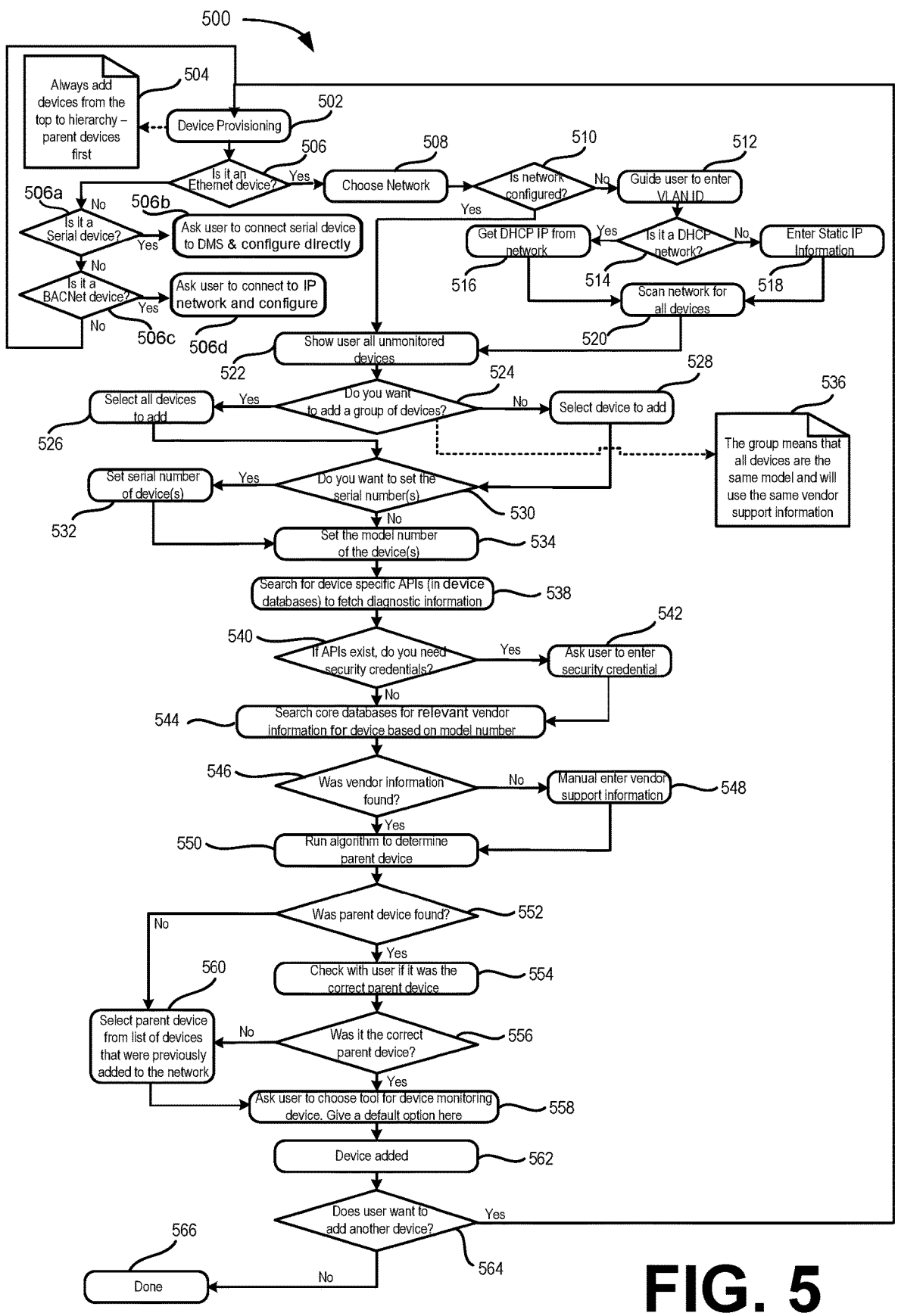
FIG. 5 illustrates a provisioning flow diagram of the disclosed system, in accordance with at least one embodiment.

FIG. 5 illustrates an exemplary, primarily manual, provisioning flow diagram 500 of the disclosed device monitoring system, in accordance with at least one embodiment. At step 502, the disclosed system initiates a step of device provisioning. Block 504 instructs the user to add devices to the container VLAN from the top of a device hierarchy for a particular subnetwork and indicates the parent devices need to be provisioned first. At step 506, the disclosed system asks the user whether the device to be added is an ethernet device. If so, the logic flows to step 508 to select the correct ethernet network and follow the further steps for ethernet provisioning. If not, at step 506*a*, the disclosed system determines whether the device to be added is a serial device on determining that it is not an ethernet device. If the device is a serial device, the process instructs the user to connect the serial device to the device monitoring system at step 506*b* and configure the device directly. If the device is not a serial device, the system asks the user whether the device to be added is a BACnet device as indicated in step 506*c*. If the device is identified as a BACnet device, the process asks the user to connect the device to an appropriate BACnet IP network as indicated in step 506*d* for further discovery and provisioning through relevant protocols. If the device is not a BACnet device, the process returns to the original device provisioning step 502 to start the determination process again.

For Ethernet devices, the process moves to step 508 for selection of the correct network of corresponding devices (e.g., the connected subnetworks of Ethernet devices) for further provisioning and discovery. At step 510, the disclosed system determines whether the network is configured. If so, the process moves directly to step 522 described below. If not, the process moves to step 512, wherein the device monitoring system guides the user to enter a VLAN ID for the subnetwork. Then, at step 514, the device monitoring system determines whether the configured network is a DHCP network. If so, at step 516, the device monitoring system obtains the DHCP IP from the network. If the network is determined not to be a DHCP network, the device monitoring system facilitates the user to enter static IP information at step 518. Then, at step 520, the device monitoring system scans the network for all the devices.

At step 522, the device monitoring system displays all the monitored devices to the user upon determining that the network is configured or upon completion of network configuration and scanning for all network devices as undertaken in step 520. At step 524, the device monitoring system asks the user whether he/she wants to add a group of devices or a single device to a particular container. Block 536 depicts that typically a group means that all the devices are the same model and will use the same vendor support information. At step 526, the device monitoring system prompts the user to select all the devices to be added on determining that the user wants to add the group of devices to a container. At step 528, the device monitoring system prompts the user to select a single device to be added on determining that the user does not want to add the group of devices.

At step 530, the device monitoring system asks the user whether to set one or more serial numbers corresponding to each of the devices. At step 532, the device monitoring system prompts the user to set the serial number of the device(s) on determining that the user wants to set one or more serial numbers corresponding to each of the devices. At step 534, the device monitoring system sets the model number for each of the devices (e.g., based upon MAC address). At step 538, the device monitoring system performs a search in a device database (e.g., device database 215 associated with web server 211) to identify the device-specific APIs to fetch diagnostic information. At step 540, the device monitoring system asks if security credentials are required upon identifying device-specific APIs in the device database. At step 542, the device monitoring system prompts the user to enter security credentials. Upon determining the security credentials are not required or upon receiving the security credentials from the user, the device monitoring system performs a search in a database (e.g., device database 214 associated with web server 211) for service vendor information for the device(s) based on the model number at step 544. At step 546, the device monitoring system determines whether the vendor information is identified. If not, vendor information can be manually entered for the device(s) if known, as indicated in step 548.

After identifying the vendor information, at step 550, the device monitoring system runs an algorithm to determine whether there is a parent device in the subnetwork. At step 552, the device monitoring system determines whether the parent device is identified. If no parent device is found, the process moves to step 560 to prompt the user to select a parent device from a list of parent devices previously added to the network if appropriate. If a parent device is found, the device monitoring system checks with the user if the identified parent device is correct at step 554. If the parent device is determined to be incorrect, the process again moves to step 560 to prompt the user to select a parent device from a list of parent devices previously added to the network if appropriate. If the parent device is confirmed as correct, at step 558, the device monitoring system prompts the user to select a tool for device monitoring and present a default option as well. At step 562, the device monitoring system adds the device(s) to the container. At step 564, the device monitoring system prompts the user to add another device. If so, the process returns to step 502. If not, the process of provisioning ends as indicated in step 566.

Figure 6A:
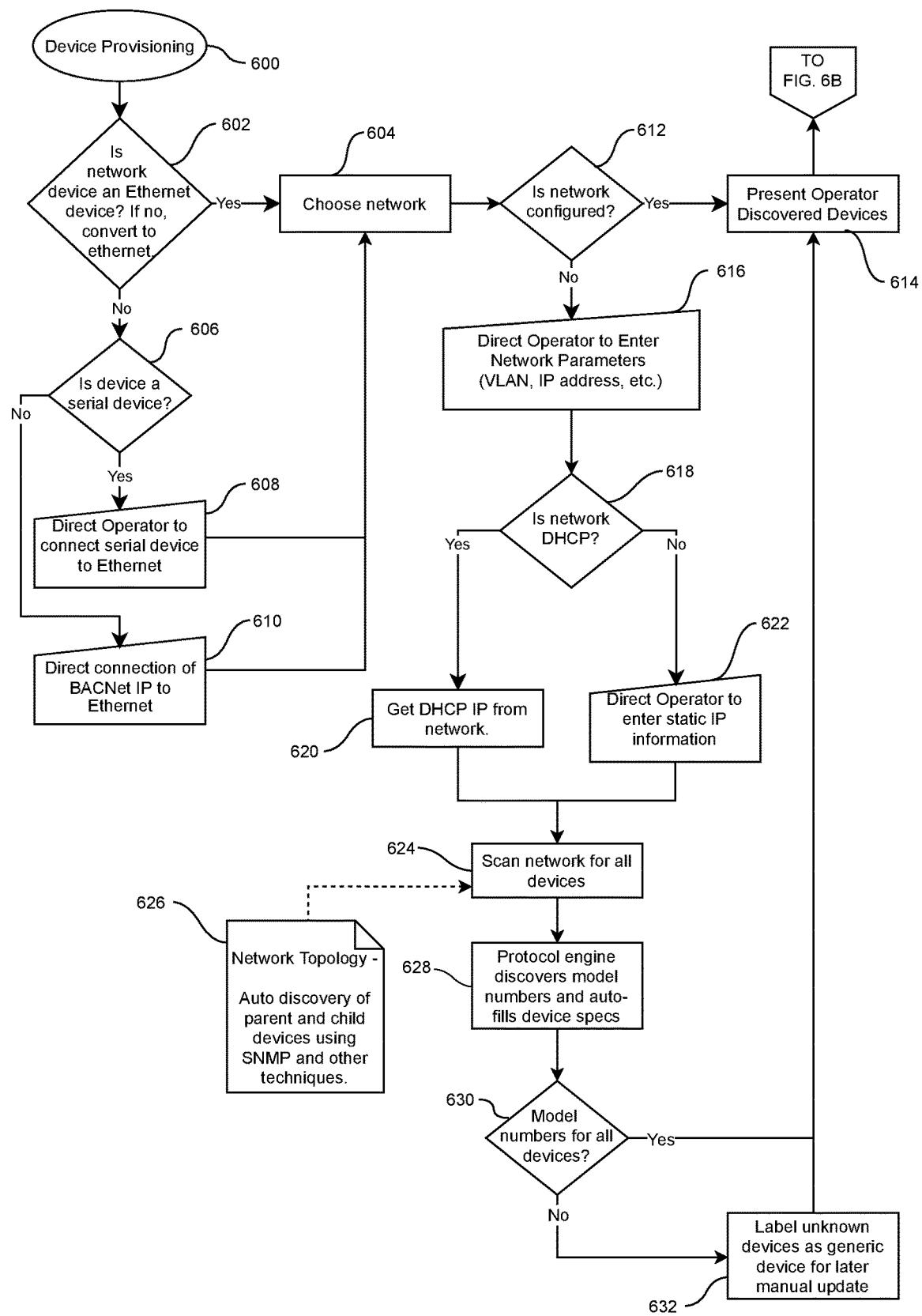
FIG. 6A illustrates a first portion of an alternate embodiment of a provisioning flow diagram of the disclosed system.
Figure 6B:
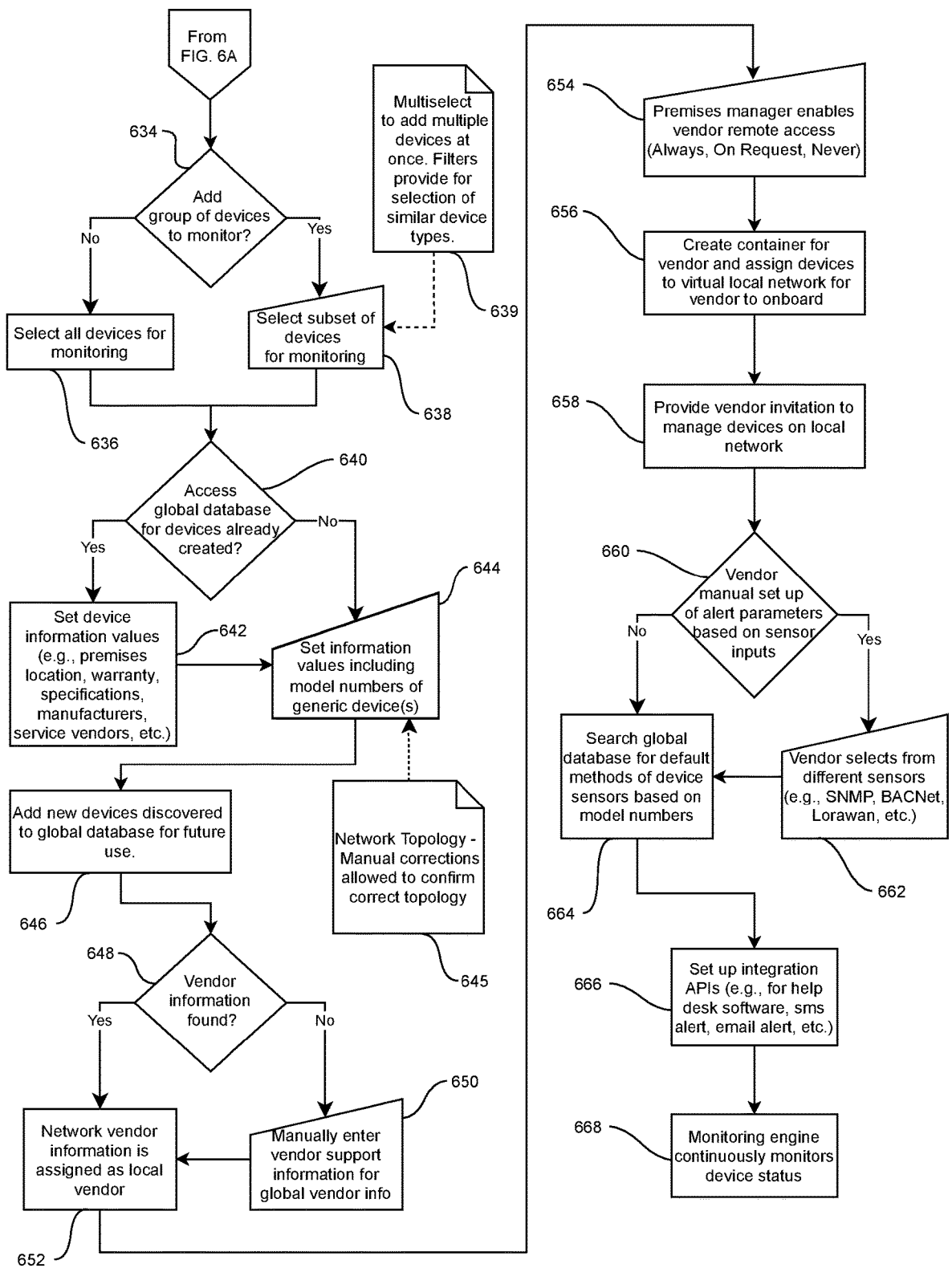
FIG. 6B illustrates a second portion of the alternate embodiment of the provisioning flow diagram of FIG. 6A.
Figure 7:
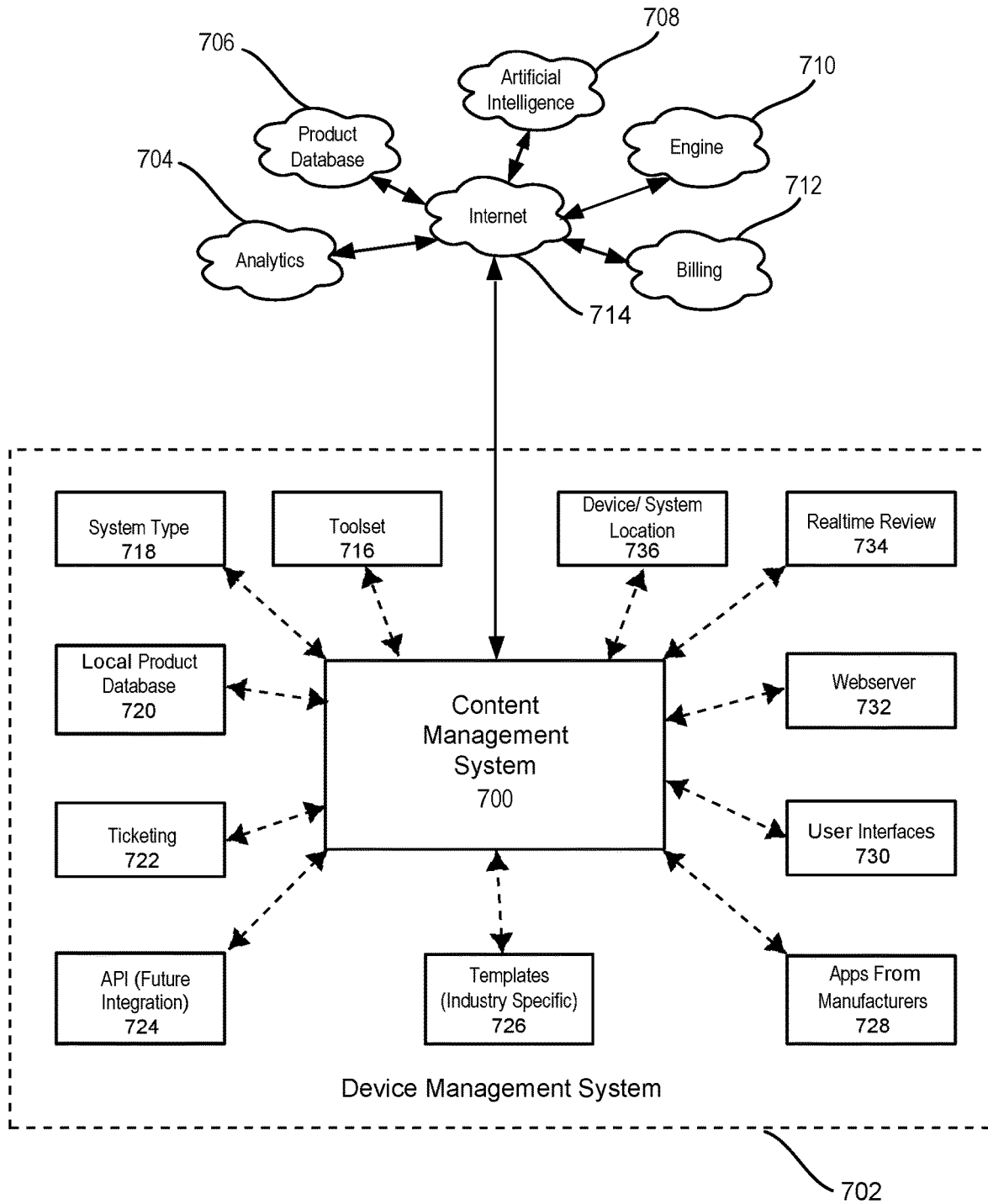
FIG. 7 illustrates a network implementation of a content management system (CMS), in accordance with at least one embodiment.

FIGS. 6A and 6B together depict a flow diagram of an exemplary, alternative provisioning process 600 of the device monitoring system that is more automated than the example process of FIG. 5. At step 602, the process 600 determines whether a device connected to the device monitoring system uses an Ethernet connection. If so, the process 600 moves to step 604, which will be described in further detail shortly below. If not, the system first determines whether the connected device is presently configured or connected to the LAN as a serial device as indicated at step 606. If so, the process 600 prompts the premises operator to connect the device to the device monitoring system via Ethernet for better system performance and security as indicated at step 608. If the device is not a serial device, the system determines that the device is likely a BACnet configured device and prompts the premises operator to configure the BACnet device for Ethernet communication and connect the device to an Ethernet switch on the LAN.

Returning to step 604, once the devices attached have been configured for Ethernet communication, the process 600 determines whether the network (e.g., the particular subnetwork of the device) has been configured as indicated in step 612. If the network has already been configured, the premises operator is presented with a list of discovered devices on the network as indicated in step 614. If the network has not yet been configured, the process 600 at step 616 directs the premises operator to enter appropriate network parameters (e.g., VLAN membership identification, IP addresses, etc.) for devices on the primary LAN and on any subnetworks. Then, at step 618, the process 600 determines whether the configured network uses Dynamic Host Configuration Protocol (DHCP). If so, the system requests assigned DHCP IP addresses on the LAN for each of the devices from the NAT managing the LAN as indicated in step 620. If DHCP is not implemented, the process 600 prompts the premises operator to enter the static IP addresses assigned to each of the devices on the LAN into the device monitoring system as indicated in step 622.

The device monitoring system then scans the LAN for all connected devices to confirm connections based upon the network information procured or entered and to identify any devices not previously noted as indicated in step 624. There are several tools that can be employed to automatically discover the topology of a network, e.g., Simple Network Management Protocol (SNMP), as indicated by note 626. Once all devices are discovered, a protocol engine compares the discovered devices with information on a device database (e.g., device database 215 in FIG. 2) to identify their make and model number and then also map them to a product database to download their specifications, images, images, user manuals, etc. for further provisioning as indicated in step 628. The process 600 then determines whether model numbers have been acquired for all devices as indicated in step 630. If so, the process moves directly to step 614 to present all the discovered devices to the premises operator. If not, the process 600 first labels any unknown devices as "generic" for manual update later in the process 600 as indicated in step 632, and the process 600 then moves to step 614.

Upon presentation of the devices on the network to the premises operator, the process 600 asks the premises operator whether a subset group of the devices is to be selected for monitoring as indicated in step 634. If not, all devices discovered are automatically selected for monitoring as indicated in step 636. If a subset is to be configured, the premises operator is provided the opportunity to manually select devices for the subset as indicated in step 638. Tools may be provided for multiple device selection, e.g., filtering interfaces for selection of devices of the same type or having common features as indicated in note 639. Once devices are selected for monitoring, the process 600 may provide access to a global database of device-specific information such as premises location, warranty specifications, manufacturers, service vendors, etc., as indicated in query 640. If the premises operator wants to use this data access feature, the process 600 automatically associates relevant data with each device in a separate database associated with the particular network or subset as indicated in step 642. The premises operator is then provided an opportunity to review and change any of the information automatically assigned as indicated in step 644. Similarly, if the premises operator declined automatic association of device specific information in response to query 640, the premises operator may still set enter and associate information for specific devices manually as indicated in step 644 and in note 645. This is also the opportunity for the premises operator to add model numbers for generic devices identified in step 632. Additionally, if the premises owner adds information (e.g., model numbers) that were not previously saved in the global database, such information is provided to the global database for updating as indicated in step 646.

Next, the process 600 determines whether service vendor information for the group of was provided from either the global database or by the premises operator as indicated in query 648. If no service vendor was previously identified, either automatically or manually, the process 600 prompts the premises operator to identify and assign a service vendor to the group of devices as indicated in operation 650. Once manually identified, or if identified in the global data associated with the devices, the service vendor so identified is formally assigned to be the service vendor for the group of devices on this local network as indicated in step 652.

Next, at step 654, the process 600 asks the premises operator to enable access to the group of devices for the assigned vendor. This access can be at several different levels, e.g., constant, on request (by the vendor or by the premises operator), or never, as indicated. The process 600 next creates a virtual local network and a container environment for the vendor with respect to the selected group of devices as indicated in step 656. The container environment limits vendor access to only the selected devices on the corresponding VLAN and provides tools that allow the vendor to check status, troubleshoot, and correct malfunctions of the assigned devices. Once the container is created, an invitation may be sent (e.g., via e-mail, SMS text) to the service vendor requesting the vendor access the container as indicated in step 658.

When the vendor responds to the invitation, e.g., by accessing a hyperlink to connect with the container, the vendor may be given the option to manually set up alert parameters based upon sensor inputs of the devices in the group as indicated in operation 660. If the vendor opts to manually set the alert parameters, a number of different configuration tool options may be presented (e.g., SNMP, BACnet, Lorawan, etc.) as indicated in step 662. Alternatively, if the vendor elects not to manually configure device sensors, the process 600 will search the global device database for default alerts and configurations based upon device model numbers as indicated in step 664. Similarly, if any devices were not manually configured by the vendor, the process 600 will automatically configure them with default values as indicated in step 664. The process 600 will also set up relevant integration application protocol interfaces (APIs) within the container (e.g., for SMS alerts, e-mail alerts, help software, ticketing/work order programs, etc.) as indicated in step 666. Once all of the discovery, provisioning, and configuration activities are completed for a group of devices, a monitoring engine within the device monitoring system continuously monitors the LAN for status notifications from devices in the group to identify problems and collects operating data from the devices for use in determining trends and spotting possible problems not identified by sensor alerts as indicated in step 668.

FIG. 7 illustrates an exemplary network implementation of a content management system (CMS) 700 implemented as part of the device management system 702, in accordance with at least one embodiment. The content management system CMS 700 is a software application that can be used to manage the creation and modification of data. CMSs are typically used for enterprise content management (ECM) and web content management (WCM). The CMS 700 is connected with the Internet 714. The Internet 714 transmits various data, for example, related to analytics 704, product data from a product database 706, artificial intelligence (AI)-developed data 708 reflecting patterns discerned among common devices to aid in troubleshooting, maintenance, and correction, data from ECM or WCM engines 710, and billing data 712. Further, the data managed may be related to the available tool sets 716, system types 718, local product databases 720, ticketing systems 722, APIs available for future integration 724, industry-specific templates 726 (e.g., interfaces for hotel properties vs. hospital properties), diagnostic and configuration applications from manufacturers 728, user interfaces 730, webserver proxy information 732, real-time device review tools 734, and device/system location tools, e.g., particular to the group of devices on the LAN.

Figure 8:
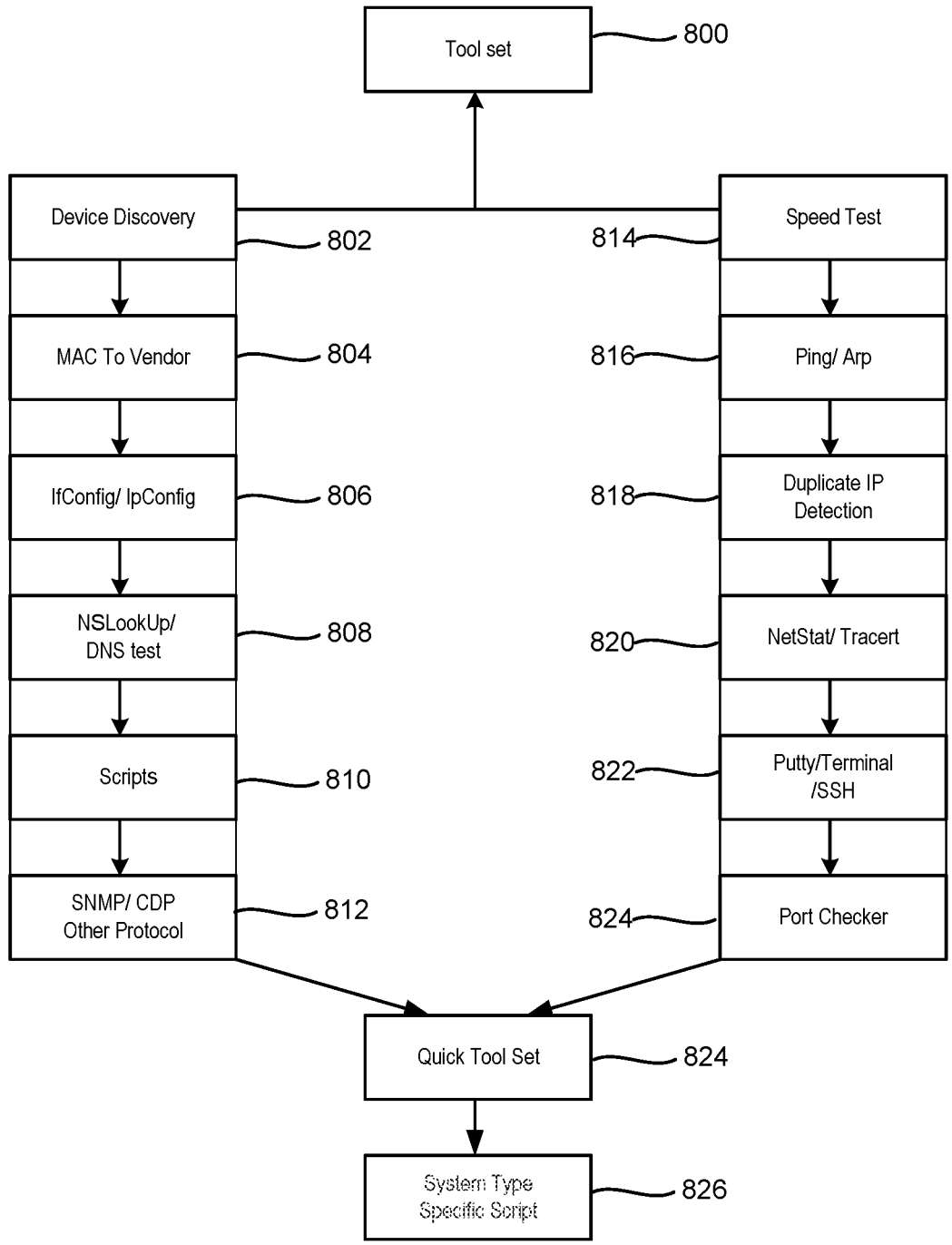
FIG. 8 illustrates a block diagram of the basic network tool set, in accordance with at least one embodiment.

FIG. 8 illustrates a block diagram of an exemplary tool set 800 of the disclosed system referenced in FIG. 7. The tool set 800 may include software application modules for network diagnostics, including, for example, device discovery 802, MAC address identification 804, Ifconfig/IPConfig 806, NSLookUp and DNS Test 808, published scripts 810, SNMP/CDP 812, speed test 814, ping/ARP ping 816, duplicate IP detection 818, NetStat/Tracert/TraceRoute, putty/terminal/SSH, and port checker. In addition, a quick tool set 826 may be provided for developing and/or storing specific system-type scripts 828 that a vendor may use when troubleshooting or repairing a network device.

Figure 9:
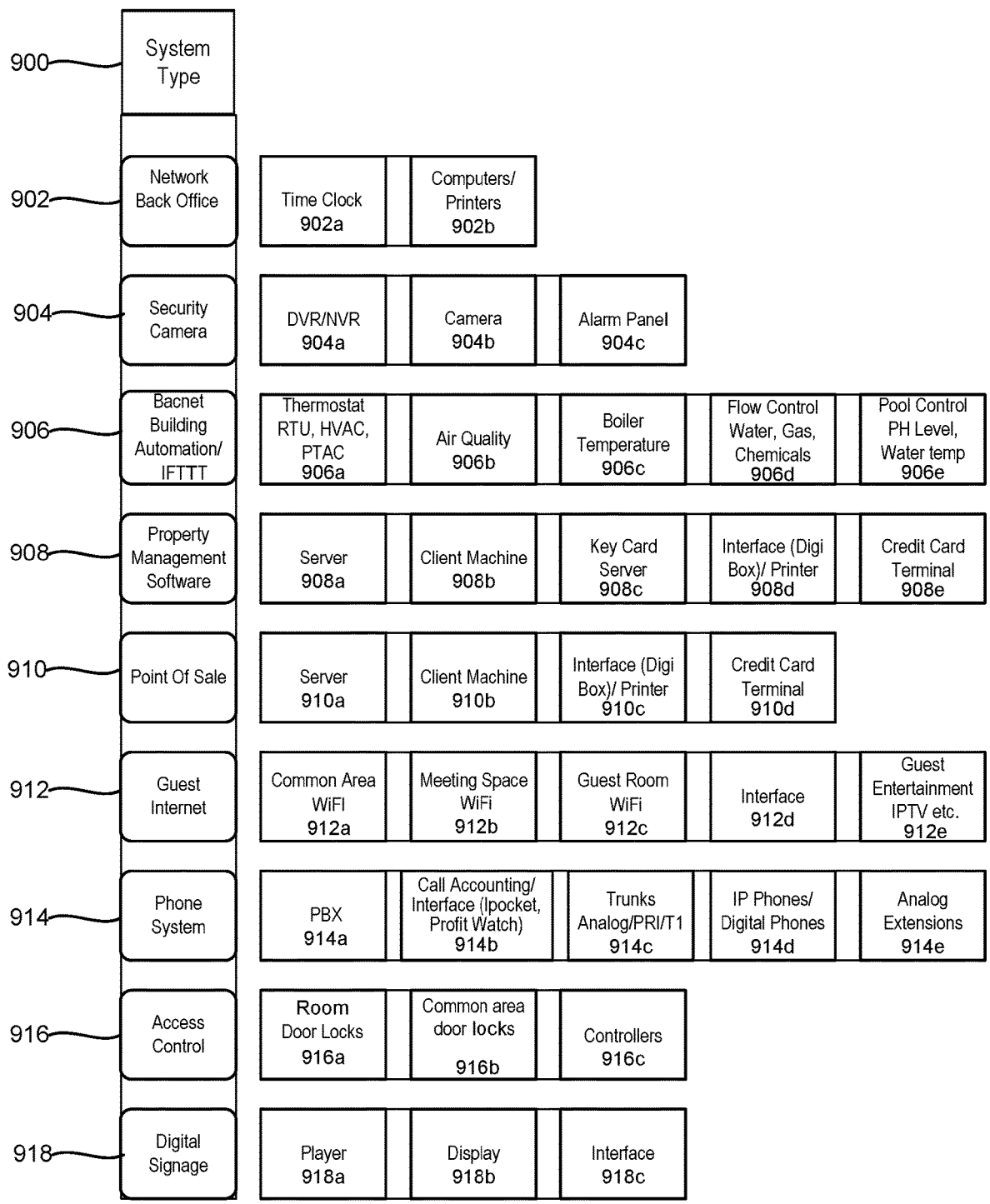
FIG. 9 illustrates a block diagram of a system type, in accordance with at least one embodiment.

FIG. 9 illustrates a block diagram of an exemplary system types 900 in which embodiments of the device monitoring system may be usefully and advantageously installed. Possible system types include a network back-office system 902, a security camera system 904, a BACnet building automation/IFTTT system 906, a property management software system 908, a point-of-sale system 910, a guest Internet system 912, a phone system 914, an access control system 916, and a digital signage system 918. Network devices on the network back-office system 902 may include a time clock 902a, and computers/printers 902b. Network devices on the security camera system 904 may include DVRs/NVRs 904a, cameras 904b, and an alarm panel 904c. Network devices on the BACnet building automation/IFTTT system 906 includes thermostat RTU, HVAC, and PTAC sensors 906a, air quality sensors 906b, boiler temperature sensors 906c, flow control sensors 906d (e.g., for water, gas, and chemicals), and pool control sensors 906e (e.g., for PH level, and water temperature). Network devices on the property management software system 908 may include a server 908a, client machines 908b, a key card server 908c, an interface (e.g., Digi box)/printers 908d, and credit card terminals 908e. Network devices on the point-of-sale system 910 may include a server 910a, client machines 910b, interface devices (e.g., Digi box)/printers 910c, and credit card terminals 910d. Devices on the guest Internet system 912 may include common area WIFI routers 912a, meeting space Wi-Fi routers 912b, guest room Wi-Fi routers 912c, interface devices 912d, and guest entertainment devices 912e (e.g., IPTV, etc.). Network devices on the phone system 914 may include a PBX 914a, call accounting/interface devices 914b (e.g., Ipocket, profit watch, etc.), trunks analog/PRI/T1 devices 914c, IP Phones/Digital Phones 914d, and analog extensions 914e. Network devices on the access control system 916 may include room door locks 916a, any common area doors 916b, and related controllers 916c. Network devices on the digital signage system 918 may include video players 918a, display devices 918b, and user interfaces 918c (e.g., information kiosks).

According to exemplary embodiments described herein, the device monitoring system may obtain analytics data by analysing devices installed at various locations (e.g., country, state, city), date/time, verticals, and type of building (e.g., commercial buildings, hospitality, assisted living, student housing, residential single-family, townhouse, apartment, and condo premises). Further, the device management system may analyse the data related to the system type (as explained in conjunction with FIG. 9). Further, the device management system may analyse user data across multiple properties owned or managed by the same corporation, e.g., as is the case with franchisors (e.g., hotels, restaurants, retail stores, etc.). The device monitoring system can analyse the data related to the vendor service provider/vendor and services performed and to specific device products and manufacturers. The device monitoring system may also analyse status data, uptime/downtime data, warranty data, and end of life data.

Figure 10:
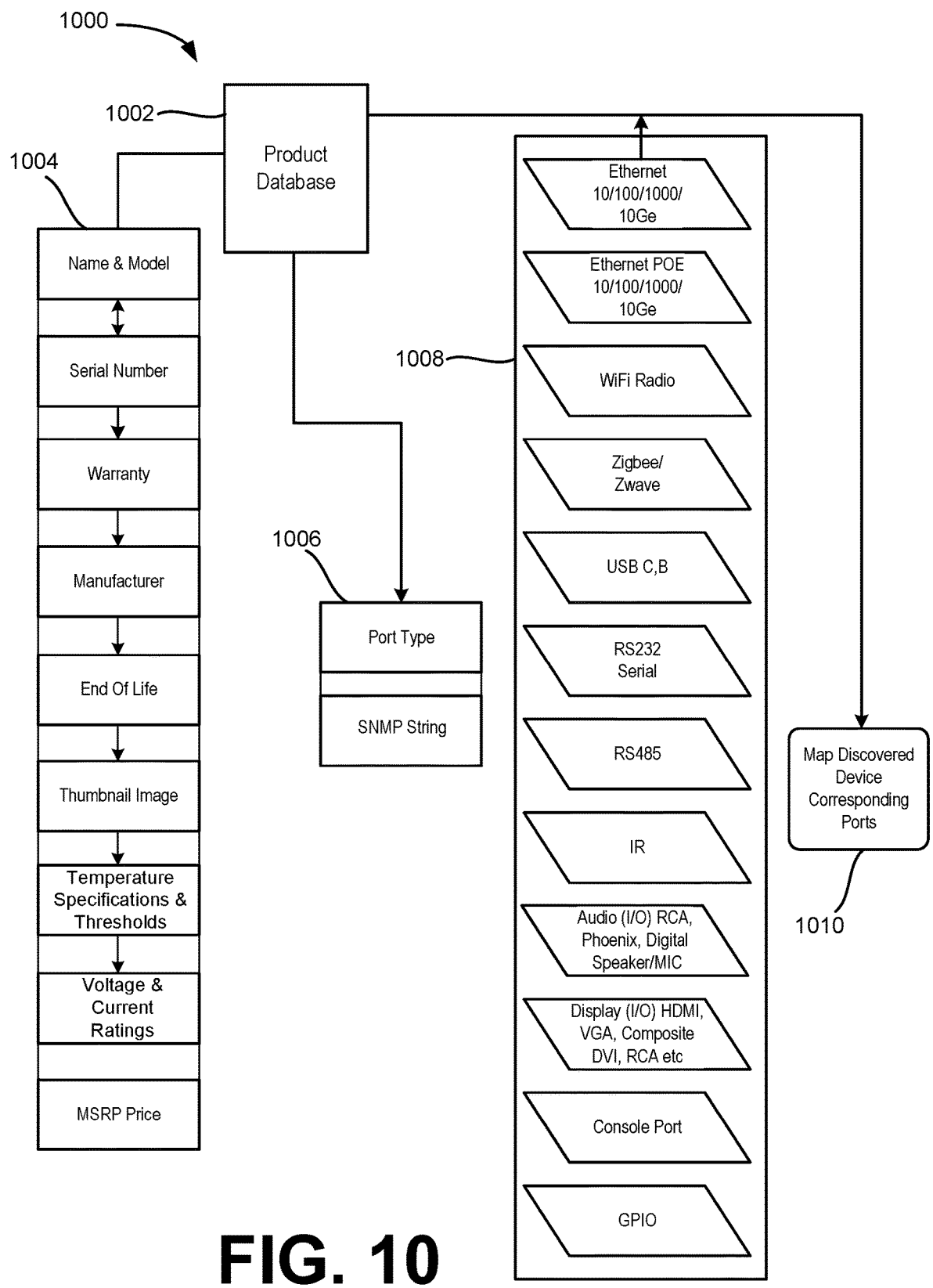
FIG. 10 illustrates a block diagram of a product database, in accordance with at least one embodiment.

FIG. 10 illustrates a block diagram 1000 of an exemplary product database 1002, in accordance with at least one embodiment. The product database 1002 may include product specific data 1004 pertaining to the connected devices, for example, name and model, serial number, warranty, manufacturer, end of life, thumbnail image, temperature specifications and other device thresholds, voltage and current ratings, and MSRP. Further, the product database 1002 may include default port and IP configuration data 1006, for example, port type and SNMP string. Furthermore, the product database 1002 may include device connection data 1008, for example, available connector types for the device and related instructions such as for Ethernet 10/100/1000/ 10Ge, Ethernet POE 10/100/1000/10Ge, Wi-Fi Radio, Zigbee/Zwave, USB-C, USB-B, RS232 Serial, RS485, infrared (IR), Audio (I/O) RCA, Phoenix, digital speaker/MIC, display (I/O) HDMI, VGA, Composite DVI, RCA, console port, General Purpose Input/Output (GPIO), etc. Additionally, the product database 1002 may include data pertaining to device ports discovered on devices 1010.

Figure 11:
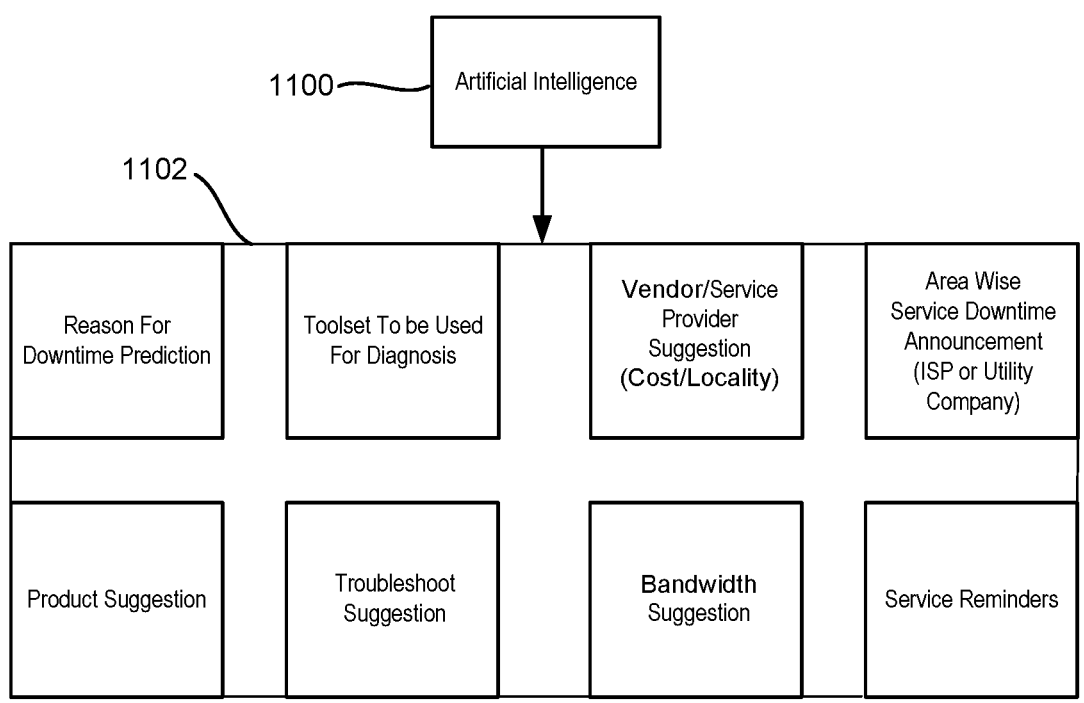
FIG. 11 illustrates a block diagram of artificial intelligence used by the disclosed system, in accordance with at least one embodiment.

FIG. 11 illustrates a block diagram of an artificial intelligence engine 1100 that may be used by the disclosed system, in accordance with at least one embodiment. The disclosed system may apply an artificial intelligence engine 1100 to process collected network data to provide various predictions 1102 and suggestions such as downtime predictions and reasons therefor, identification of toolsets to be used for diagnostics, vendor/service provider suggestions (e.g., based upon cost effectiveness of proximity to locality), product suggestions, troubleshooting suggestions, service reminders, bandwidth suggestions, area-wide service downtime announcements (ISP or Utility Company).

Figure 12:
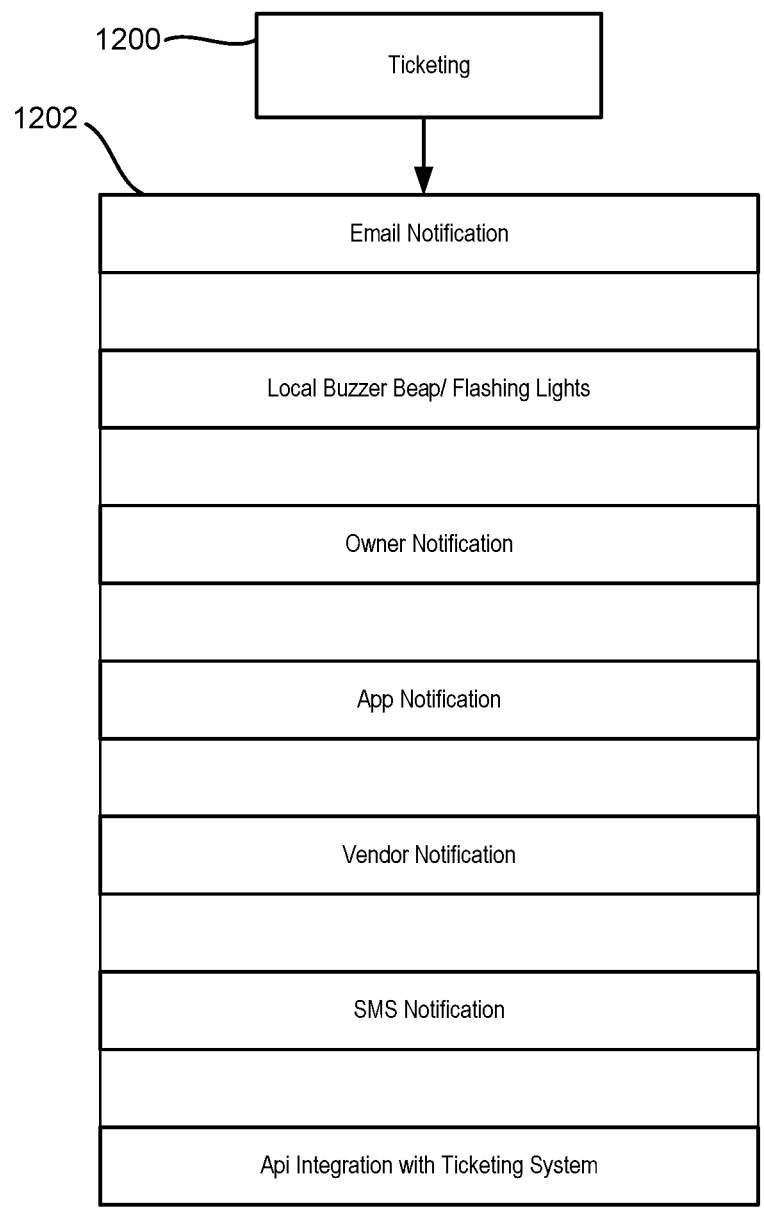
FIG. 12 illustrates a block diagram of a ticketing operation performed by the disclosed system, in accordance with at least one embodiment.

FIG. 12 illustrates a block diagram of an exemplary ticketing operation 1200 for managing service requests and completed repairs performed by the disclosed system, in accordance with at least one embodiment. The ticketing operation 1200 may include a number of notification functions 1202, for example, e-mail notifications, local buzzer beeps/flashing lights, owner notifications, application notification (e.g., push notifications), vendor notifications, SMS message notifications, direct API Integration with ticketing systems, etc.

Figure 13:
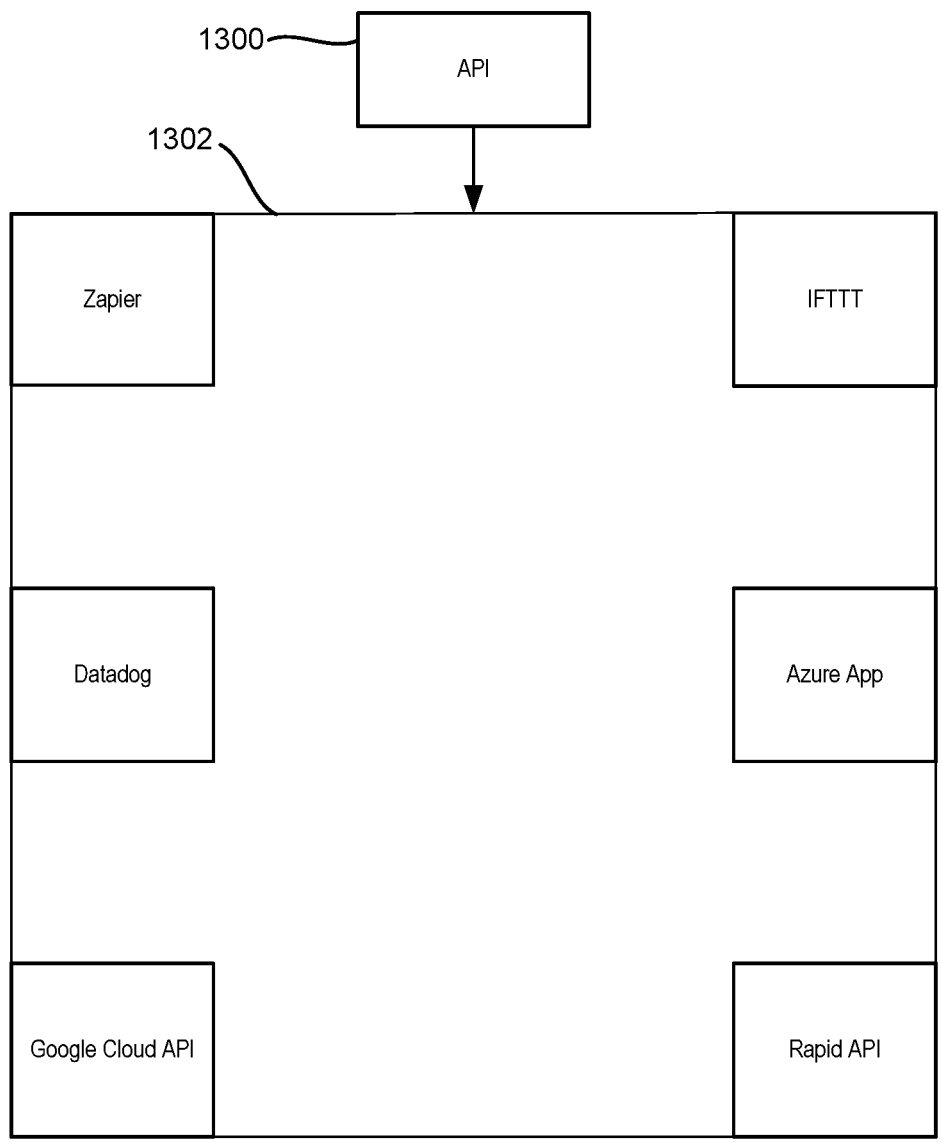
FIG. 13 illustrates a block diagram of a plurality of APIs used by the disclosed system, in accordance with at least one embodiment.

FIG. 13 illustrates a block diagram of a plurality of exemplary systems which the system may integrate with using application program interfaces from an API repository 1300. Such application integrations may include Zapier, IFTTT, Datadog, Azure App, Google Cloud API, and Rapid API.

Figure 14:
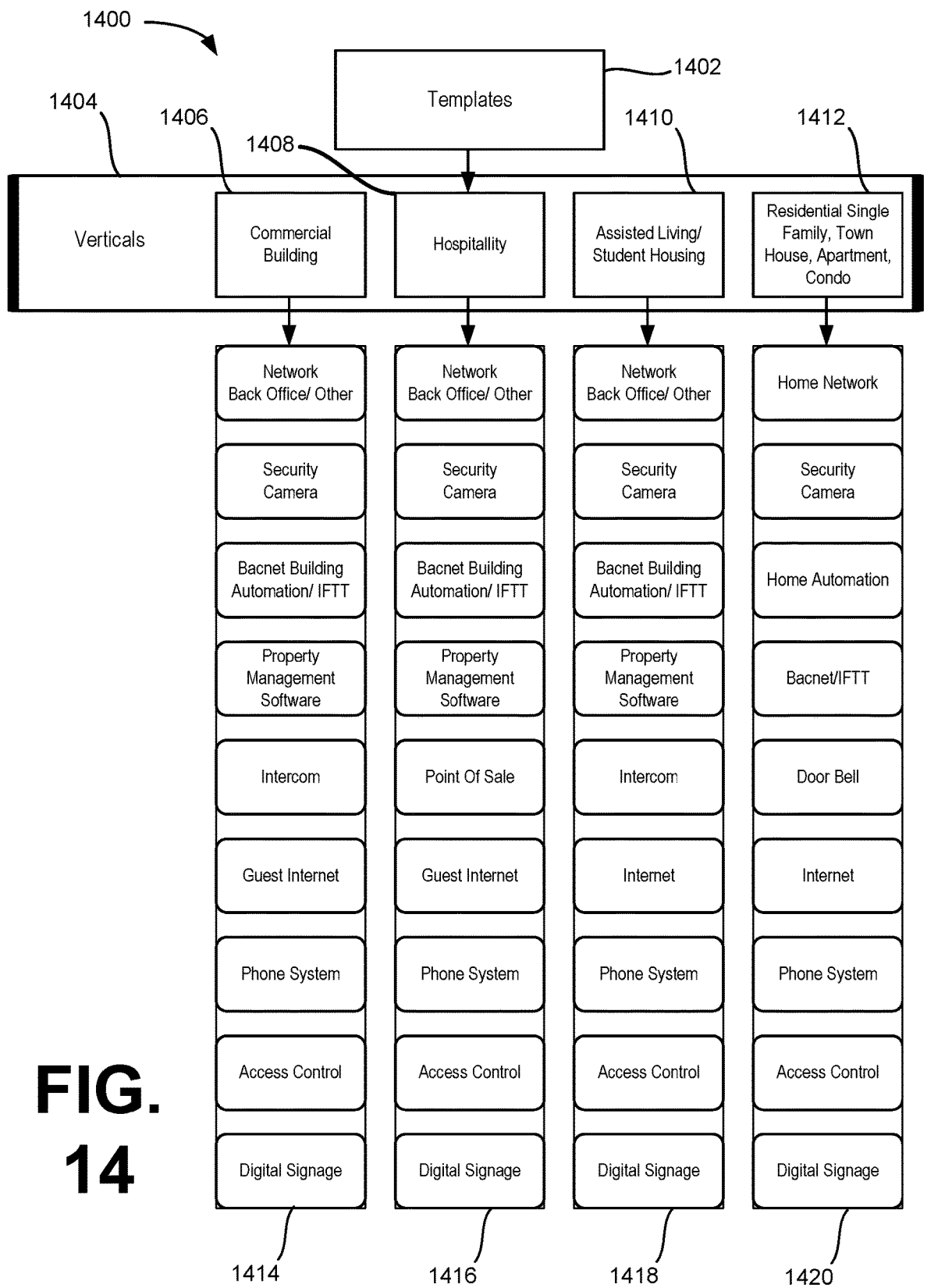
FIG. 14 illustrates a block diagram of a plurality of templates used by the disclosed system, in accordance with at least one embodiment.

FIG. 14 illustrates a block diagram 1400 of a plurality of exemplary data and user interface templates 1402 which may be used by the disclosed system for predetermined network configurations, in accordance with at least one embodiment. The plurality of templates 1402 may include templates for various verticals 1404 such as commercial buildings 1406, hospitality 1408 (e.g., hotels), assisted living/student housing 1410, and residential single-family, townhouse, apartment, condo communities 1412. The commercial building vertical template 1406 may have specific modules 1414 for management of the following systems: network back office/other, security cameras, BACnet building automation/IFTT, property management software, intercom, guest Internet, phone system, access control, and digital signage. The hospitality vertical template 1408 may have specific modules 1416 for management of the following systems: network back office/other, security camera, BACnet building automation/IFTT, property management software, Point of Sale, guest Internet, phone system, access control, and digital signage. The assisted living/student housing vertical template 1410 may have specific modules 1418 for management of the following systems: network back office/other, security cameras, BACnet building automation/IFTT, property management software, intercom, Internet, phone system, access control, and digital signage. The residential single family, townhouse, apartment, the condo vertical template 1412 may have specific modules 14206 for management of the following systems: the home network, security cameras, home automation, BACnet/IFTT, doorbell, Internet, phone system, access control, and digital signage.

Figure 15:
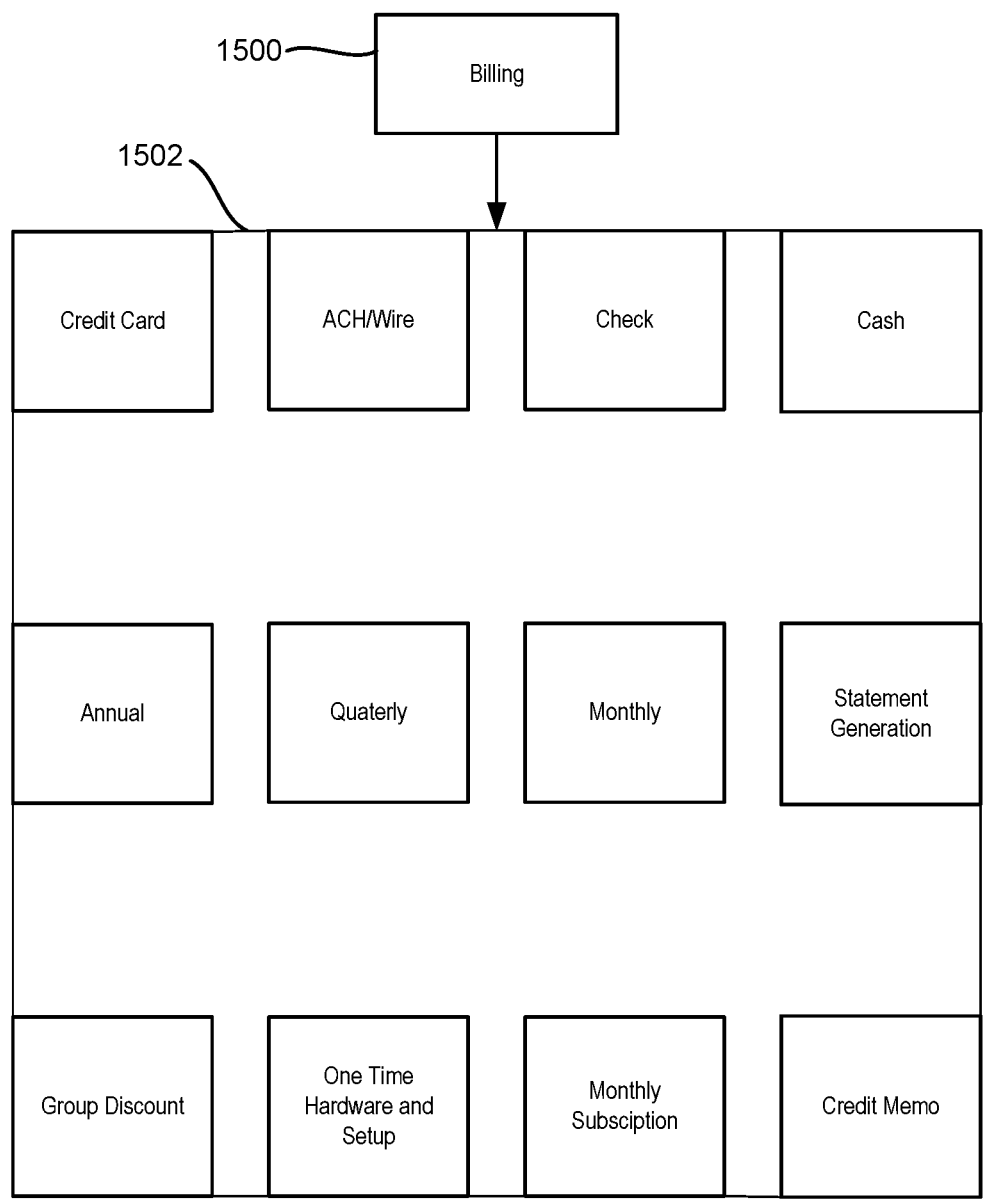
FIG. 15 illustrates a block diagram of billing data used by the disclosed system, in accordance with at least one embodiment.

FIG. 15 illustrates a block diagram of exemplary billing data 1500 that may be used and processed by the disclosed system, in accordance with at least one embodiment. The billing data 1500 may include, but is not limited to, categories 1502 such as credit card, ACH/wire, cheque, cash, annual, quarterly, monthly, statement generation, group discount, one-time hardware and setup, monthly subscription, and credit memos.

Figure 16:
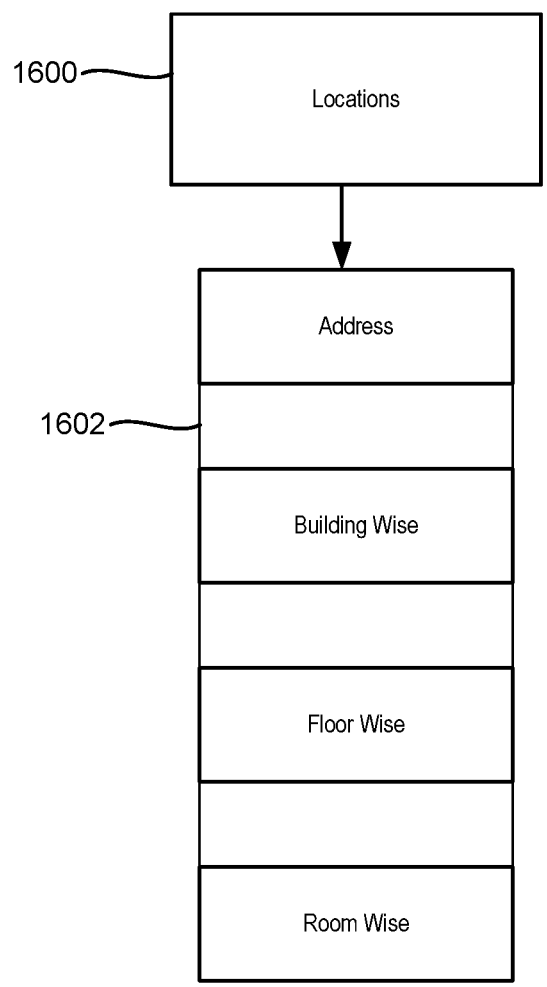
FIG. 16 illustrates a block diagram of location data used by the disclosed system, in accordance with at least one embodiment.

FIG. 16 illustrates a block diagram of exemplary premises locations 1600 used by the disclosed system, in accordance with at least one embodiment. The location data 1602 may include, but is not limited to, physical (street) address, floor, room, and building on a premises. Such data can be associated with particular devices to provide physical location information for each of the devices on the premises and connected to the LAN.

Figure 17:
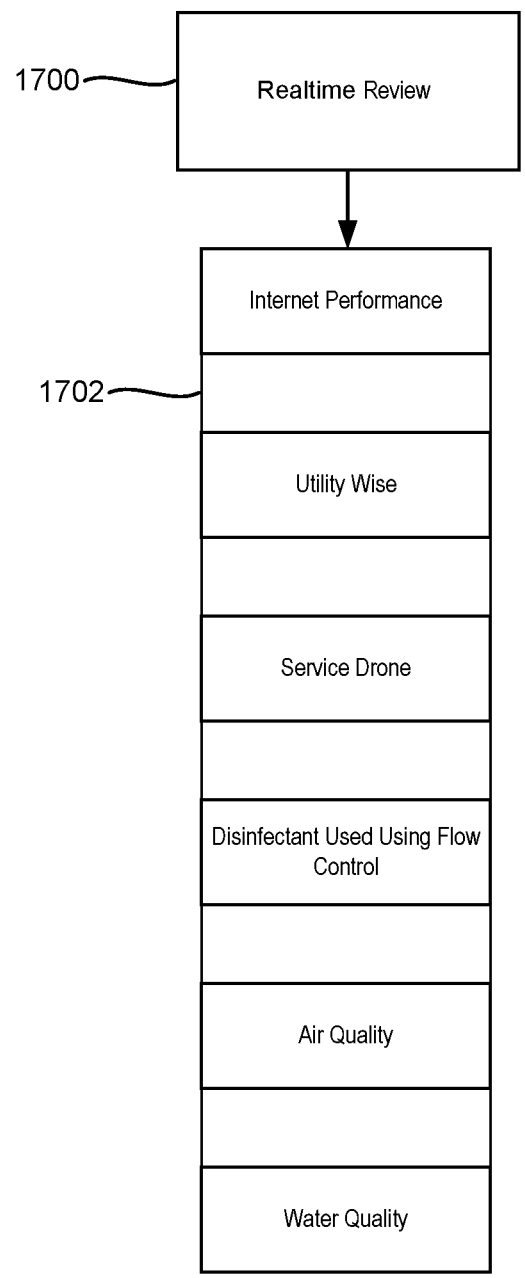
FIG. 17 illustrates a block diagram of review data used by the disclosed system, in accordance with at least one embodiment.

FIG. 17 illustrates a block diagram of exemplary real-time review interface 1700 provided by the disclosed system, in accordance with at least one embodiment. The review data 1702 for presentation within the real-time review interface 1700, may include, but is not limited to, Internet performance, utility characteristics, service characteristics, the presence of disinfectants, air quality, and water quality.

The technology described herein may be implemented as logical operations and/or modules in one or more systems. The logical operations may be implemented as a sequence of processor-implemented steps executing in one or more computer systems and as interconnected machine or circuit modules within one or more computer systems. Likewise, the descriptions of various component modules may be provided in terms of operations executed or effected by the modules. The resulting implementation is a matter of choice, dependent on the performance requirements of the underlying system implementing the described technology. Accordingly, the logical operations making up the embodiments of the technology described herein are referred to variously as operations, steps, objects, or modules. Furthermore, it should be understood that logical operations may be performed in any order, unless explicitly claimed otherwise or a specific order is inherently necessitated by the claim language.

In some implementations, articles of manufacture are provided as computer program products that cause the instantiation of operations on a computer system to implement the procedural operations. One implementation of a computer program product provides a non-transitory computer program storage medium readable by a computer system and encoding a computer program. It should further be understood that the described technology may be employed in special purpose devices independent of a personal computer.

The above specification, examples and data provide a complete description of the structure and use of exemplary embodiments of the invention as defined in the claims. Unless otherwise defined, all terms (including technical and scientific terms) used in this disclosure have the same meaning as commonly understood by one of ordinary skill in the art to which this disclosure belongs. It is to be understood that the phrases or terms employed in this disclosure for purposes of description and not of limitation. Although various embodiments of the claimed invention have been described above with a certain degree of particularity, or with reference to one or more individual embodiments, other embodiments using different combinations of elements and structures disclosed herein are contemplated, as other iterations can be determined through ordinary skill based upon the teachings of the present disclosure. It is intended that all matter contained in the above description and shown in the accompanying drawings shall be interpreted as illustrative only of particular embodiments and not limiting. Changes in detail or structure may be made without departing from the basic elements of the invention as defined in the following claims.

The invention claimed is:

1. A method for monitoring operations and detecting failures of devices connected on a local area network comprising
   discovering a plurality of devices connected to the local area network;
   selecting a subset of the discovered devices for monitoring;
   creating a container environment within a monitoring device connected to the local area network, wherein the container environment is provisioned with a virtual network limited to the selected subset of the discovered devices;
   regularly monitoring status of the selected subset of the discovered devices on the local area network;
   providing reporting to the container environment regarding the status of the selected subset of the discovered devices in the virtual network; and
   providing access to the container environment to a remote computing device external to the local area network for communication with the selected subset of the discovered devices by the remote computing device, whereby access by the remote computing device to the local area network is limited to the selected subset of the discovered devices provisioned on the virtual network in the container environment.

2. The method of claim 1 further comprising creating a secure TCP tunnel over the Internet for direct communication between the remote computing device and the container environment created within the monitoring device.

3. The method of claim 1, wherein the discovering step further includes discovering serial bus devices configured for connection with an Ethernet network.

4. The method of claim 1, wherein the discovering step further includes discovering BACnet devices configured for connection with an Ethernet network.

5. The method of claim 1, wherein the regularly monitoring step comprises
   sending periodic status requests from the container environment directly to each of the selected devices on the virtual network within the container environment; and
   monitoring for return messages in response to the status requests.

6. The method of claim 1 further comprising providing notification of an adverse condition with respect to a device among the subset of the discovered devices on the virtual network within the container to a service vendor associated with the remote computing device.

7. The method of claim 1, wherein
   the local area network further comprises a gateway device that manages access to and routes communications to devices connected to the local area network; and
   the method further comprises managing access by and routing communications from the remote computing device received at the monitoring device to the subset of the discovered devices on the virtual network directly from the container environment in the monitoring device rather than via the gateway device.

8. The method of claim 1 further comprising
   assigning access to the container environment to a service vendor associated with the remote computing device; and
   limiting access to the container environment to the service vendor via the remote computing device by providing the service vendor authentication credentials for use by the remote computing device.

9. The method of claim 1 further comprising
   discovering device type information and model information for each device of the subset of the discovered devices on the virtual network;
   transmitting a request to a remote computer server for technical data and software tools related to the device type and model information discovered;
   receiving the technical data and software tools from the remote computer server; and
   storing the device type information, the model information, the technical data and the software tools in a database within the container environment with respective association to each device of the subset of the discovered devices.

10. The method of claim 1 further comprising transmitting container status information describing the container environment to a remote server computer for combination with additional container status information from other container environments on other networks to which the service vendor has access for combined presentation to the remote computer device by the remote server computer.

11. The method of claim 10 further comprising
    collecting performance data related to each device in the subset of the discovered devices; and
    transmitting the performance data to the remote computer server for incorporation into a store of the technical data on the remote computer server.

12. A monitoring device for use on a local area network for monitoring operations and detecting failures of devices connected within the local area network, the monitoring device comprising
    a first network connector for connecting the monitoring device to a switch connected to the devices on the local area network;
    a memory including a database structure; and
    a processor configured to perform the following operations:
       discover a plurality of devices connected to the local area network;
       select a subset of the discovered devices for monitoring;
       create a container environment within the monitoring device, wherein the container environment is provisioned with a virtual network limited to the selected subset of the discovered devices;
       regularly monitor status of the selected subset of the discovered devices on the local area network;
       provide reporting to the container environment regarding the status of the selected subset of the discovered devices in the virtual network; and
       provide access to the container environment to a remote computing device external to the local area network for communication with the selected subset of the discovered devices by the remote computing device, whereby access by the remote computing device to the local area network is limited to the selected subset of the discovered devices provisioned on the virtual network in the container environment.

13. The monitoring device of claim 12 the processor is further configured to create a secure TCP tunnel over the Internet for direct communication between the remote computing device and the container environment created within the monitoring device.

14. The monitoring device of claim 12, wherein the processor is further configured to discover serial bus devices configured for connection with an Ethernet network.

15. The monitoring device of claim 12, wherein the processor is further configured to discover BACnet devices configured for connection with an Ethernet network.

16. The monitoring device of claim 12, wherein the processor is further configured to
send periodic status requests from the container environment directly to each of the selected devices on the virtual network within the container environment; and
monitor for return messages in response to the status requests.

17. The monitoring device of claim 12, wherein the processor is further configured to provide notification of an adverse condition with respect to a device among the subset of the discovered devices on the virtual network within the container to a service vendor associated with the remote computing device.

18. The monitoring device of claim 12, wherein
the local area network further comprises a gateway device that manages access to and routes communications to devices connected to the local area network; and
the monitoring device further includes a second network connector for connecting to the gateway device; and
the processor is further configured to manage access by and route communications from the remote computing device received at the monitoring device to the subset of the discovered devices on the virtual network directly from the container environment in the monitoring device rather than via the gateway device.

19. The monitoring device of claim 12, wherein the processor is further configured to
assign access to the container environment to a service vendor associated with the remote computing device; and
limit access to the container environment to the service vendor via the remote computing device by providing the service vendor authentication credentials for use by the remote computing device.

20. The monitoring device of claim 12, wherein the processor is further configured to
discover device type information and model information for each device of the subset of the discovered devices on the virtual network;
transmit a request to a remote computer server for technical data and software tools related to the device type and model information discovered;
receive the technical data and software tools from the remote computer server; and
store the device type information, the model information, the technical data and the software tools in a database within the container environment with respective association to each device of the subset of the discovered devices.

21. The monitoring device of claim 12, wherein the processor is further configured to transmit container status information describing the container environment to a remote server computer for combination with additional container status information from other container environments on other networks to which the service vendor has access for combined presentation to the remote computer device by the remote server computer.

22. The monitoring device of claim 21, wherein the processor is further configured to
collect performance data related to each device in the subset of the discovered devices; and
transmit the performance data to the remote computer server for incorporation into a store of the technical data on the remote computer server.

* * * * *